United States Patent
Fujita et al.

(10) Patent No.: US 7,481,294 B2
(45) Date of Patent: Jan. 27, 2009

(54) ELECTRIC POWER STEERING SYSTEM

(75) Inventors: Shuji Fujita, Nishikamo-gun (JP); Eiji Kasai, Toyota (JP); Ippei Yamazaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 547 days.

(21) Appl. No.: 11/211,759

(22) Filed: Aug. 26, 2005

(65) Prior Publication Data

US 2006/0070794 A1 Apr. 6, 2006

(30) Foreign Application Priority Data

Oct. 1, 2004 (JP) ............... 2004-289539

(51) Int. Cl.
*B62D 5/04* (2006.01)

(52) U.S. Cl. .................... 180/446; 701/41
(58) Field of Classification Search ........... 180/446; 701/41, 22
See application file for complete search history.

(56) References Cited

U.S. PATENT DOCUMENTS

| | | | |
|---|---|---|---|
| 4,961,474 A | 10/1990 | Daido et al. | |
| 5,311,432 A | 5/1994 | Momose | |
| 6,334,502 B1 * | 1/2002 | Tsujimoto | 180/446 |
| 6,366,842 B1 * | 4/2002 | Kaji et al. | 701/41 |
| 6,466,848 B2 * | 10/2002 | Ozaki | 701/41 |
| 7,136,732 B2 * | 11/2006 | Shimizu et al. | 701/41 |
| 2002/0026270 A1 | 2/2002 | Kurishige et al. | |
| 2003/0164261 A1 | 9/2003 | Takahashi | |

FOREIGN PATENT DOCUMENTS

| | | |
|---|---|---|
| EP | 0 350 819 | 1/1990 |
| EP | 0 546 789 A2 | 6/1993 |
| EP | 1 184 258 A2 | 3/2002 |
| EP | 1 332 943 A1 | 8/2003 |
| JP | A-7-132845 | 5/1995 |
| JP | B2 2970351 | 8/1999 |

* cited by examiner

*Primary Examiner*—Paul N Dickson
*Assistant Examiner*—Maurice Williams
(74) *Attorney, Agent, or Firm*—Oliff & Berridge, PLC

(57) ABSTRACT

The CPU calculates axial force matching external force that acts on a rack bar by combining steering torque MT that acts on a steering shaft with assist torque AT generated by an electric motor. The CPU then determines whether a vehicle is running straight based on a steering angle θ, a vehicle speed V, and the axial force F. Thus, even in a state where a control steering angle midpoint is deviated and a driver applies torque so as to return a turning position of a steering wheel to a neutral position, whether the vehicle is running straight can be accurately determined by making a determination by using the axial force F that acts on the rack bar. The CPU can set a considerably accurate control steering angle midpoint by calculating a smoothed steering angle midpoint by using an instantaneous steering angle midpoint in an accurately determined straight-running state.

17 Claims, 10 Drawing Sheets

ELECTRIC POWER STEERING SYSTEM

INCORPORATION BY REFERENCE

The disclosure of Japanese Patent Application No. 2004-289539 filed on Oct. 1, 2005 including the specification, drawings and abstract is incorporated herein by reference in its entirety.

BACKGROUND OF THE INVENTION

1. Field of Invention

The invention relates to an electric power steering system including a steering shaft which turns along with a steering wheel operated by a driver; a steering mechanism which connects the steering shaft to steered wheels of a vehicle, and which converts a turning motion of the steering shaft into a linear motion, thereby steering the steered wheels of the vehicle; an electric motor which applies force for assisting a turning operation of the steering wheel; a steering angle sensor which detects a turning angle of the steering shaft; and a drive control unit which controls driving of the electric motor based on the turning angle detected by the steering angle sensor.

2. Description of Related Art

An electric power steering system with a learning function has been well-known, for example, as disclosed in Japanese Patent No. 2970351 (JP-B-2970351). The electric power steering system determines whether a vehicle is running straight based on results of determination concerning a vehicle speed condition, a torque condition, and a steering angle condition. When it is determined that the vehicle is running straight, the electric power steering system averages output values which are obtained from the steering angle sensor the predetermined number of times that sampling is performed, thereby calculating an average value of the output values. The calculated average value is compared with the predetermined number of other stored average values. The average values selected by the comparison are further averaged, whereby a midpoint output value indicating a midpoint of the steering angle (hereinafter, referred to as a "steering angle midpoint") is set.

However, in the above-mentioned type of electric power steering system, whether the vehicle is running straight is determined based on whether steering torque detected by a steering torque sensor satisfies the torque condition. Accordingly, there is a possibility that whether the vehicle is running straight cannot be determined accurately. In the case where steering angle midpoint is deviated, for example, if returning control of a steering wheel is performed by an electric motor, the turning position of the steering wheel connected integrally with a steering shaft is deviated from the neutral position, and the vehicle is turned. If a driver turns the steering wheel to the neutral position so as to correct the deviation, and maintains the turning position of the steering wheel at the neutral position, the steering torque is constantly detected. Therefore, as an amount of deviation of the steering angle midpoint, that is, an amount of deviation of the turning position of the steering wheel from the neutral position increases, the value of the steering torque which is obtained by detection increases. Accordingly, even when the vehicle is running straight due to the correction made by the driver, it may be determined that the vehicle is not running straight. If whether the vehicle is running straight cannot be determined accurately, the situation where the steering angle midpoint cannot be accurately corrected continues.

SUMMARY OF THE INVENTION

It is an object of the invention to provide an electric power steering system which can accurately determine whether a vehicle is running straight, and which can compute a steering angle midpoint with high accuracy.

A first aspect of the invention relates to an electric power steering system including a steering shaft which turns along with a steering wheel operated by a driver; a steering mechanism which connects the steering shaft to steered wheels of a vehicle, and which converts a turning motion of the steering shaft into a linear motion, thereby steering the steered wheels of the vehicle; an electric motor which applies assisting force for assisting a turning operation of the steering wheel; a steering angle sensor which detects a turning angle of the steering shaft; and a drive control unit which controls driving of the electric motor based on the turning angle detected by the steering angle sensor. In the first aspect, the drive control unit includes an acting force detecting portion that detects acting force that acts on the steering mechanism; a straight-running state determining portion that determines whether the vehicle is running straight based on whether the acting force continues to be detected for a predetermined time while the detected acting force is smaller than a reference value that is set, in advance, for determining whether the vehicle is running straight; a steering angle midpoint computing portion that calculates an average value of plural angles detected by the steering angle sensor in the predetermined time, and calculates a control steering angle midpoint, which indicates a reference point that is used when the steering angle sensor detects the turning angle of the steering shaft, by using the calculated average value, when the straight-running state determining portion determines that the vehicle is running straight; and a steering angle midpoint storing portion that updates the control steering angle midpoint calculated by the steering angle midpoint computing portion, and stores the updated steering angle midpoint.

In this case, the acting force detecting portion may detect resultant force of acting force that acts on the steering mechanism due to torque applied to the steering shaft according to a turning operation of the steering wheel and acting force that acts on the steering mechanism due to driving of the electric motor, the resultant force matching external force input from the steered wheels to the steering mechanism. In this case, for example, the steering mechanism may be formed of a pinion which is attached to the steering shaft, and a rack bar which is meshed with the pinion and which converts a turning motion of the pinion to a linear motion. The acting force detecting portion may detect resultant force that acts on the rack bar.

With such a structure, even when the steering angle midpoint is deviated and torque (steering torque) is applied to the steering shaft by the driver such that the turning position of the steering wheel is returned to the neutral position against the returning control by the electric motor 30, it is possible to accurately determine whether the vehicle is running straight based on the resultant force that acts on the steering mechanism (e.g. the rack bar). In the above-mentioned state, the resultant force of the steering torque applied to the steering shaft by the driver and the assist torque that is applied due to driving the electric motor 30 and that substantially matches the steering torque acts on the steering mechanism (the rack bar). Accordingly, the acting force that acts on the steering mechanism (the rack bar) becomes small force since the steering torque and the assist torque cancel each other. In this state, if the vehicle is actually running straight, the external force (e.g. self-alignment torque) input from the steered wheels is a small value. Accordingly, if the state in which the acting force that acts on the steering mechanism (the rack bar) matches the external force (self-alignment torque) is considered, whether the vehicle is running straight can be determined accurately. It is, therefore, possible to considerably accurately calculate a reference point for detecting the turning angle of the steering shaft, that is, a control steering angle midpoint, by using plural angles (e.g. steering angles) detected in the accurately determined straight-running state of the vehicle. As a result, it is possible to appropriately control driving of the electric motor, and to apply optimum assisting force for assisting the turning operation of the steering wheel.

In the first aspect, the straight-running state determining portion may include a storage state checking portion that checks a storage state of the control steering angle midpoint that is stored in the steering angle midpoint storing portion; and a predetermined time changing portion that changes the predetermined time based on the storage state of the control steering angle midpoint, which is checked by the storage state checking portion. In this case, when the storage state checking portion confirms that the control steering angle midpoint is not stored in the steering angle midpoint storing portion, the predetermined time changing portion may set the predetermined time to a short time, as compared with a case where the control steering angle midpoint is stored in the steering angle midpoint storing portion. In addition, while the vehicle is parked, if power supply state monitoring portion that monitors a state of electric power supply from a battery mounted in the vehicle determines that the state of electric power supply from the battery is not good, the steering angle midpoint storing portion may erase the control steering angle midpoint stored therein.

With such a structure, the predetermined time for determining whether the vehicle is running straight can be appropriately changed based on the storage state of the control steering angle midpoint that is necessary for the control of driving of the electric motor. Thus, for example, if the control steering angle midpoint is stored in the steering angle midpoint storing portion, there exists the reference point for controlling driving of the electric motor. Accordingly, the predetermined time changing portion can set the predetermined time to a relatively long time such that whether the vehicle is running straight is determined more accurately. Therefore, the control steering angle midpoint having high accuracy can be obtained. On the other hand, if the control steering angle midpoint is not stored in the steering angle midpoint storing portion or if the control steering angle midpoint has been erased, there exists no reference point for controlling driving of the electric motor. Therefore, the predetermined time changing portion can calculate the control steering angle midpoint promptly by setting the predetermined time to a short time.

In the first aspect, the straight-running state determining portion may include a wheel spin detecting portion that detects wheel spin that has occurred in a drive wheel of the vehicle; and a straight-running state determination prohibiting portion that prohibits whether the vehicle is running straight from being determined when the wheel spin detecting portion detects the wheel spin that has occurred in the drive wheel. In this case, the wheel spin detecting portion may detect wheel spin that has occurred in the drive wheel based on acceleration caused in the vehicle. With such a structure, it is possible to effectively prevent an erroneous determination as to whether the vehicle is running straight by prohibiting whether the vehicle is running straight from being determined when the wheel spin has occurred in the drive wheel.

In the first aspect, the steering angle midpoint computing portion may include a first steering angle midpoint calculating portion that calculates an accumulated value of the plural angles detected in the predetermined time each time the predetermined time has elapsed, and dividing the accumulated value by the predetermined time, thereby calculating a first steering angle midpoint that indicates an average value of the plural detected angles; a second steering angle midpoint calculating portion that sequentially calculates second steering angle midpoints each of which indicates an average value of a predetermined number of the first steering angle midpoints each time the predetermined time has elapsed, by using the predetermined number of the first steering angle midpoints that are sequentially calculated by the first steering angle midpoint calculating portion each time the predetermined time has elapsed; and a control steering angle midpoint setting portion that sets the control steering angle midpoint to the second steering angle that is calculated by using the predetermined number of the first steering angle midpoints, among the second steering angle midpoints calculated by the second steering angle midpoint calculating portion.

In the first aspect, the steering angle midpoint computing portion may include the first steering angle midpoint calculating portion that calculates an accumulated value of the plural angles detected in the predetermined time each time the predetermined time has elapsed, and dividing the accumulated value by the predetermined time, thereby calculating a first steering angle midpoint that indicates an average value of the plural detected angles; a second steering angle midpoint calculating portion that assigns weights to a predetermined value and each of the first steering angle midpoints sequentially calculated by the first steering angle midpoint calculating portion each time the predetermined time has elapsed, and performing a filtering process, thereby sequentially calculating the second steering angle midpoint; and a control steering angle midpoint setting portion that sets the control steering angle midpoint, when the second steering angle midpoint sequentially calculated by the second steering angle midpoint calculating portion becomes a value in a predetermined range, to the second steering angle midpoint in the predetermined range.

In this case, the steering angle midpoint computing portion may include a vehicle speed detecting portion that detects a vehicle speed, and the second steering angle midpoint calculating portion may change a weight assigned to the first steering angle midpoint used for calculating the second steering angle midpoint based on the vehicle speed detected by the vehicle speed detecting portion. At this time, the weight assigned to the first steering angle midpoint used for calculating the second steering angle midpoint may be increased as the vehicle speed increases. When an amount of deviation of the value of the first steering angle midpoint calculated by the first steering angle midpoint calculating portion from the value of the control steering angle midpoint set by the control steering angle midpoint setting portion is equal to or larger than a first deviation amount that is set in advance, the second steering angle midpoint calculating portion may exclude the first steering angle midpoint, which is deviated from the value of the control steering angle midpoint by the first deviation amount or more, from the calculation of the second steering angle midpoint. In addition, the control steering angle midpoint setting portion may cancel the set control steering angle midpoint, when an amount of deviation of the value of the first steering angle midpoint calculated by the first steering angle midpoint calculating portion from the value of the set control steering angle midpoint is equal to or larger than a predetermined second deviation amount, and the number of times that the deviation amount becomes equal to or larger than the second deviation amount in succession becomes a predetermined number of times.

With such a structure, the steering angle midpoint computing portion can calculate the first steering angle midpoint by averaging the detected plural angles (e.g. steering angles), and calculate the second steering angle midpoint by further averaging or filtering the first steering angle midpoints. At this time, the filtering process is performed by assigning weights to the calculated first steering angle midpoint and the second steering angle midpoint that is, for example, calculated last time as the predetermined value. Then, the control steering angle midpoint can be set by using the calculated second steering angle midpoint. The control steering angle midpoint when the vehicle is running straight can be calculated considerably accurately by performing the averaging process or the filtering process repeatedly. The second steering angle midpoint calculating portion can change the weight (weighting factor) assigned to the predetermined value (e.g. the second steering angle midpoint calculated last time) of the first steering angle midpoint, which is used for calculation of the second steering angle midpoint, based on the detected vehicle speed. If the vehicle speed increases, it is highly possible that the vehicle is running straight. Accordingly, it is highly possible that the first steering angle midpoint calculated when the detected vehicle speed is high is the steering angle midpoint indicating that the vehicle is actually running straight. Therefore, the second steering angle midpoint calculating portion can considerably accurately calculate the control steering angle midpoint when the vehicle is running straight, by increasing the weight (weighting factor) assigned to the first steering angle midpoint when the detected vehicle speed is high.

The second steering angle midpoint calculating portion can improve the accuracy of calculation of the second steering angle midpoint by excluding the first steering angle midpoint, when the amount of deviation of the value of the calculated first steering angle midpoint from the value of the set control steering angle midpoint becomes equal to or larger than the predetermined first deviation amount. Also, the second steering angle midpoint calculating portion can improve the accuracy of calculation of the control steering angle midpoint that is set by using the second steering angle midpoint. Since the second steering angle midpoint calculating portion exclude the first steering angle midpoint which is deviated from the value of the control steering angle midpoint by the first deviation amount or more, for example, the angle erroneously detected by the steering angle sensor can be effectively excluded. As a result, the accuracy of calculation of the second steering angle midpoint and the control steering angle midpoint can be improved.

For example, when the amount of deviation of the value of the calculated second steering angle midpoint from the value of the already set control steering angle midpoint is an amount in the predetermined range, the control steering angle midpoint setting portion can set the new control steering angle midpoint to the calculated second steering angle midpoint. Thus, it is possible to prevent the control steering angle midpoint from being changed frequently, and to smoothly operate the electric motor that is controlled based on the control steering angle midpoint. Accordingly, the driver can feel good assisting force. Also, when the amount of deviation of the value of the first steering angle midpoint from the value of the set control steering angle midpoint is equal to or larger than a predetermined second deviation amount, and the number of times that the deviation amount becomes equal to or larger than the second deviation amount in succession becomes the predetermined number of times (e.g. three times), the control steering angle midpoint setting portion cancels the set control steering angle midpoint. This is because it is highly possible that the presently set control steering angle midpoint is wrong. In such a case, inappropriate driving control of the electric motor can be stopped by canceling the set control steering angle midpoint.

In the first aspect, the drive control unit may include a steering angle midpoint accuracy determining portion that determines that the control steering angle midpoint stored in the steering angle midpoint storing portion is accurate, when an amount of deviation of the average value of the plural steering angles, which is calculated by the steering angle midpoint computing portion from the value of the control steering angle midpoint stored in the steering angle midpoint storing portion is smaller than a predetermined third deviation amount, or when the control steering angle midpoint stored in the steering angle midpoint storing portion is updated. Also, the drive control unit may include a prohibition range changing portion that broadens a range of the detected angle, in which driving of the electric motor is prohibited, when the steering angle midpoint accuracy determining portion determines that the control steering angle midpoint stored in the steering angle midpoint storing portion is not accurate.

With such a structure, the drive control unit can broaden the range of the detected angle, in which driving of the electric motor is prohibited, based on the accuracy of calculation determined by the steering angle midpoint accuracy determining portion. It is, therefore, possible to prevent inappropriate driving of the electric motor, and to appropriately operate the electric motor that is controlled based on the control steering angle midpoint. Accordingly, the drive can feel good assisting force.

In addition, in the first aspect, the drive control unit may include a mounting-presence-or-absence determining portion that determines whether a behavior control device which detects abnormal behavior while the vehicle is turning, and which corrects the detected abnormal behavior is mounted in the vehicle; an employment-possibility determining portion that determines whether the neutral position of the steering shaft, which is set by the behavior control device for detecting a turning state of the vehicle, can be employed as the control steering angle midpoint; and a control steering angle midpoint selecting portion that selects the neutral position as the control steering angle midpoint if the employment-possibility determining portion determines that the neutral position of the steering shaft can be employed as the control steering angle midpoint. In this case, the employment-possibility determining portion may determine whether the neutral position of the steering shaft set by the behavior control device can be employed as the control steering angle midpoint based on the operating state of the behavior control device. In addition, the behavior control device mounted in the vehicle may set the neutral position of the steering shaft based on a yaw rate caused in the vehicle or lateral acceleration caused in the vehicle.

With such a structure, since the considerably accurate neutral position of the steering shaft set by the behavior control unit can be employed as the control steering angle midpoint, it is possible to appropriately operate the electric motor that is controlled based on the control steering angle midpoint. Accordingly, the driver can feel good assisting force. Also, whether the behavior control unit is mounted in the vehicle is determined, and the operating state of the behavior control device is checked. As a result, with one control specification, driving of the electric motor can be controlled in the optimum manner based on the specification of the vehicle and the operating state of the behavior control device.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

A: First Embodiment

Figure 1:
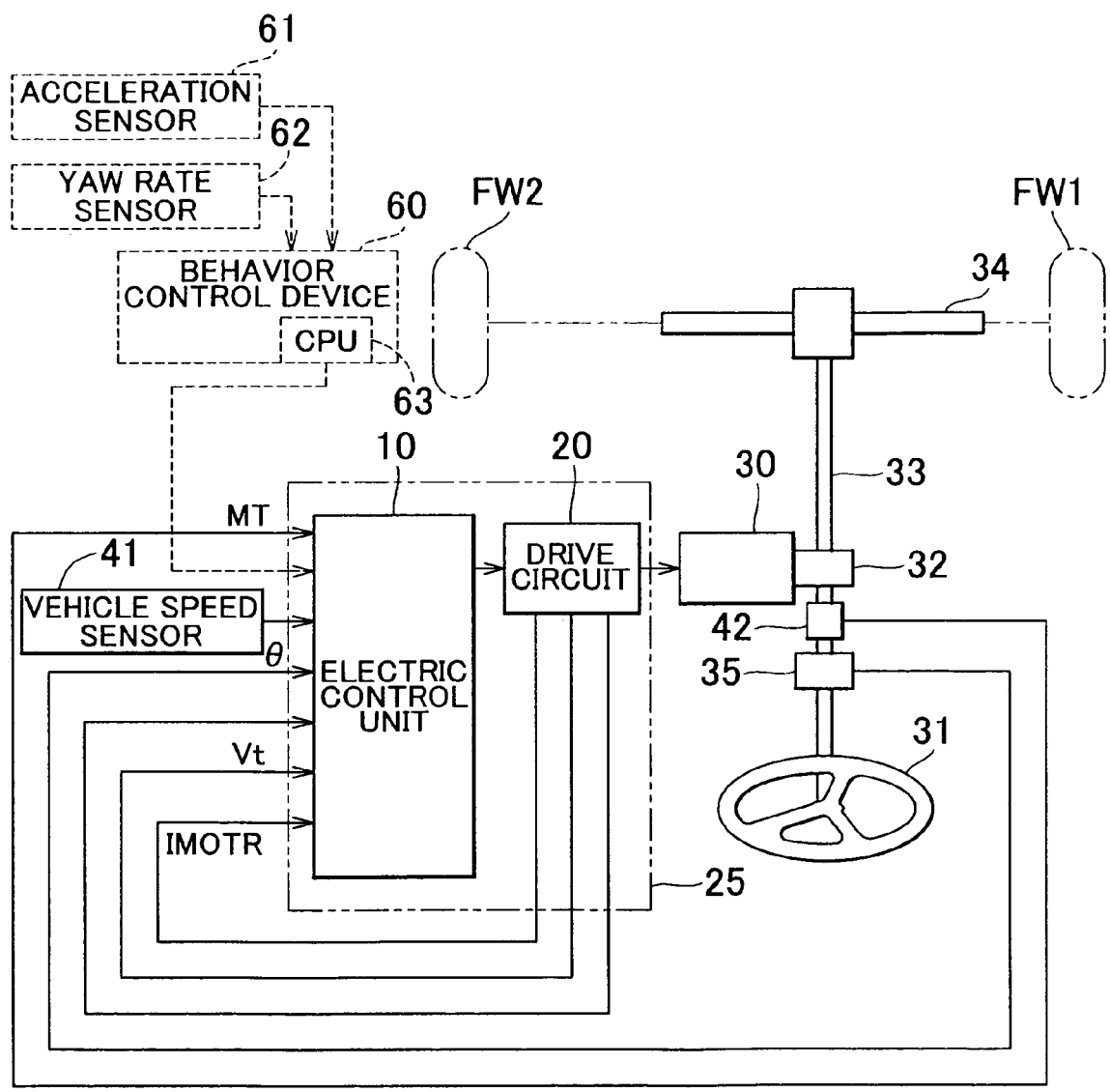
FIG. 1 is a view schematically showing an electric power steering system of a vehicle according to each of a first embodiment and a second embodiment of the invention.

Hereafter, a steering system of a vehicle according to a first embodiment of the invention will be described with reference to accompanying drawings. FIG. 1 is a block diagram schematically showing an electric power steering system according to the first embodiment of the invention.

The electric power steering system includes a drive control unit 25 including an electric control unit (circuit) 10 and a drive circuit 20 connected with the electric control unit 10; and a direct current electric motor 30 that is controlled by the drive circuit 20.

The electric motor 30 supplies force for assisting a steering operation of right and left front wheels FW1 and FW2, which is performed by a turning operation of a steering wheel 31. Accordingly, the electric motor 30 is attached to a steering shaft 33 via a deceleration mechanism 32 such that torque can be transmitted to the steering shaft 33 via the deceleration mechanism 32. A rack bar 34 is driven in the axial direction via a pinion (not shown) according to the turning operation of the steering wheel 31, whereby the right and left front wheels FW1 and FW2 that are connected to the rack bar 34 via a tie rod are steered. A steering angle sensor 35, which detects a turning angle of the steering wheels 31, that is, a steering angle θ, is attached to the steering shaft 33.

Figure 2:
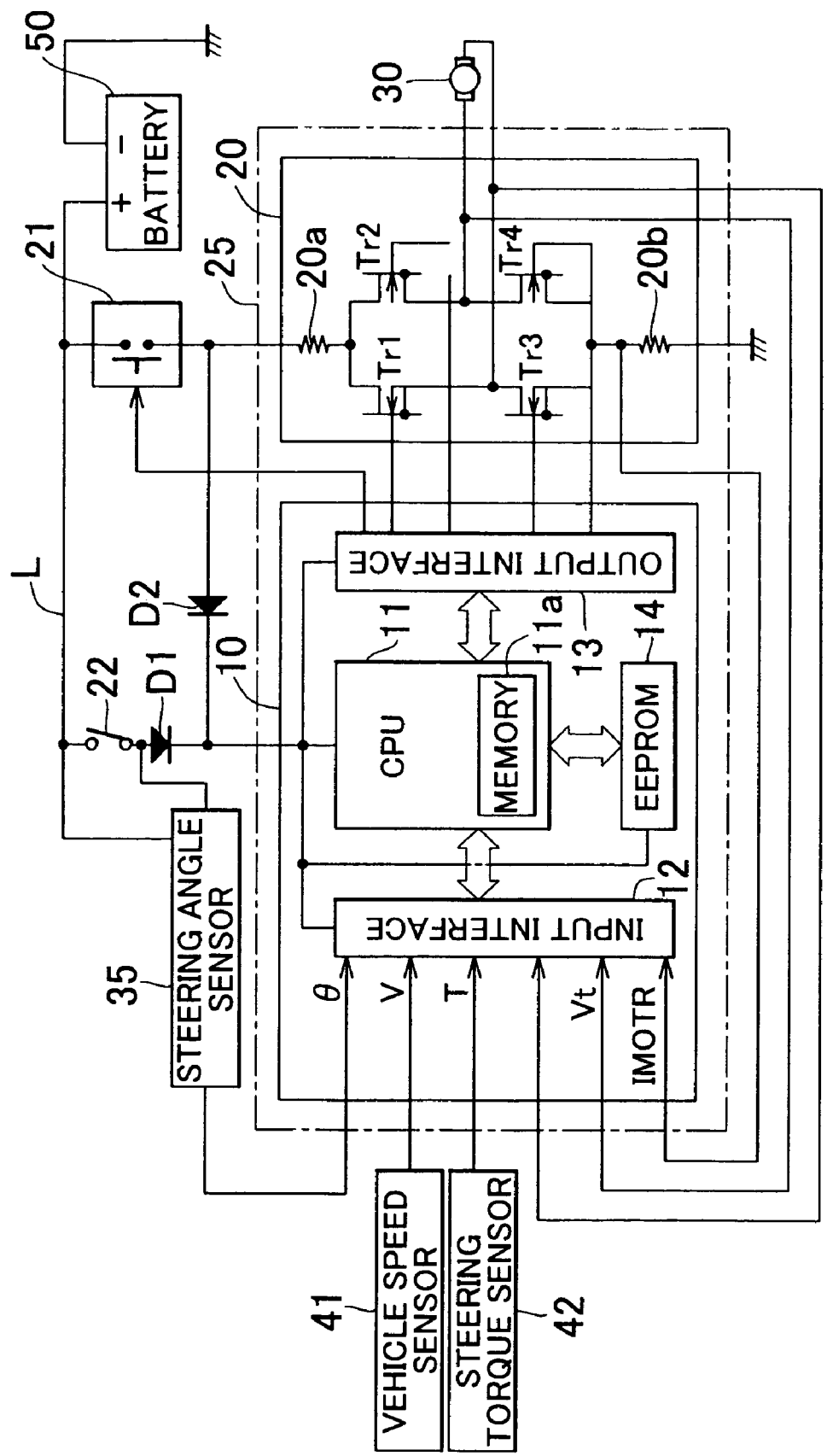
FIG. 2 is a block diagram schematically showing a drive control unit shown in FIG. 1.

Next, the electric circuit of the electric power steering system shown in FIG. 1 will be described in detail with reference to FIG. 2. The electric control unit 10 includes a microcomputer (CPU) 11, an input interface 12, an output interface 13, and EEPROM (Electrical Erasable PROM) 14. The CPU 11 includes memory 11a which stores a steering angle midpoint computing program, which will be described later, and various data, and performs the programs stored therein, thereby controlling an operation of the electric control unit 10. The input interface 12 is connected to the CPU 11 via a bus, and also connected to the steering angle sensor 35, a vehicle speed sensor 41, and a steering torque sensor 42. The input interface 12 transmits detection signals from these sensors to the CPU 11.

The vehicle speed sensor 41 detects and outputs a vehicle speed V. The steering torque sensor 42 detects and outputs steering torque T that is applied to the steering shaft 33 according to the turning operation of the steering wheel 31 performed by a driver. Each of the steering angle sensor 35, the vehicle speed sensor 41, and the steering torque sensor 42 transmits a detection signal to the input interface 12.

The output interface 13 is connected to the CPU 11 via the bus, and connected to the drive circuit 20 and a normally open type relay 21. The output interface 13 transmits a signal for changing conductive states of the drive circuit 20 and the relay 21 based on a command transmitted from the CPU 11. The EEPROM 14 is storing means for storing data even when electric power is not supplied from a battery 50 of the vehicle. The EEPROM 14 is connected to the CPU 11 via the bus. The EEPROM 14 stores the data (e.g. data indicating a control steering angle midpoint which will be described later) supplied from the CPU 11, and supplies the data stored therein to the CPU 11 according to a request from the CPU 11.

The drive circuit 20 includes four switching elements Tr1, Tr2, Tr3 and Tr4 that are formed of MOSFETs whose gates are connected to the output interface 13; and two resistances 20a and 20b. One end of the resistance 20a is connected to a downstream side terminal of the relay 21 whose upstream side terminal is connected to an electric power supply line L of the battery 50. The other end of the resistance 20a is connected to a source of each of the switching elements Tr1 and Tr2. Drains of the switching elements Tr1 and Tr2 are connected to the sources of the switching elements Tr3 and Tr4, respectively. Drains of the switching elements Tr3 and Tr4 are grounded via the resistance 20b. Connection is provided between a line connecting the switching element Tr1 to the switching element Tr3 and one side of the electric motor 30. Connection is provided between a line connecting the switching element Tr2 to the switching element Tr4 and the other side of the electric motor 30. Both sides of the electric motor 30 are connected to the input interface 12, whereby the CPU 11 receives an inter-motor-terminal voltage Vt of the electric motor 30. Both sides of the resistance 20b are connected to the input interface 12. When the CPU 11 detects a voltage at each of both ends of the resistance 20b, a motor current value I MOTR of the electric motor 30 is detected.

With the above-mentioned structure, the drive circuit 20 (the electric motor 30) can receive electric power supplied from the battery 50 when the relay 21 is turned ON (i.e., when the relay 21 is closed). When the switching elements Tr1 and Tr4 are selectively placed in a conductive state (ON state), the motor current value I MOTR is applied to the electric motor 30 in a predetermined direction, and the electric motor 30 turns clockwise. Meanwhile, when the switching elements Tr2 and Tr3 are selectively placed in the conductive state, the motor current value I MOTR is applied to the electric motor 30 in a direction opposite to the above-mentioned predetermined direction, and the electric motor 30 turns counterclockwise. When the relay 21 is turned OFF (i.e., when the relay 21 is opened), a passage through which electric power is supplied to the electric motor 30 is interrupted, whereby electric power supply to the electric motor 30 is stopped.

One end of an ignition switch 22 is connected to the electric power supply line L of the battery 50. The state of the ignition switch 22 is changed between an ON state (a closed state) and an OFF state (an open state) by the steering angle sensor 35 and the driver. The other end of the ignition switch 22 is connected to the CPU 11, the input interface 12 and the output interface 13 via a diode D1. A downstream side end of the diode D1 is connected to a downstream side terminal of the relay 21 via a diode D2 which permits passage of only an electric current that flows from the downstream side of the relay 21 toward the downstream side of the diode D1. When the relay 21 is turned ON (i.e., the relay 21 is closed), electric power is supplied to the CPU 11, the input interface 12, the output interface 13 and the EEPROM 14 via the relay 21, regardless of the state of the ignition switch 22. Note that, in this specification, the following description will be made on the assumption that the relay 21 is constantly ON (i.e., the relay 21 is constantly closed).

Figure 3:
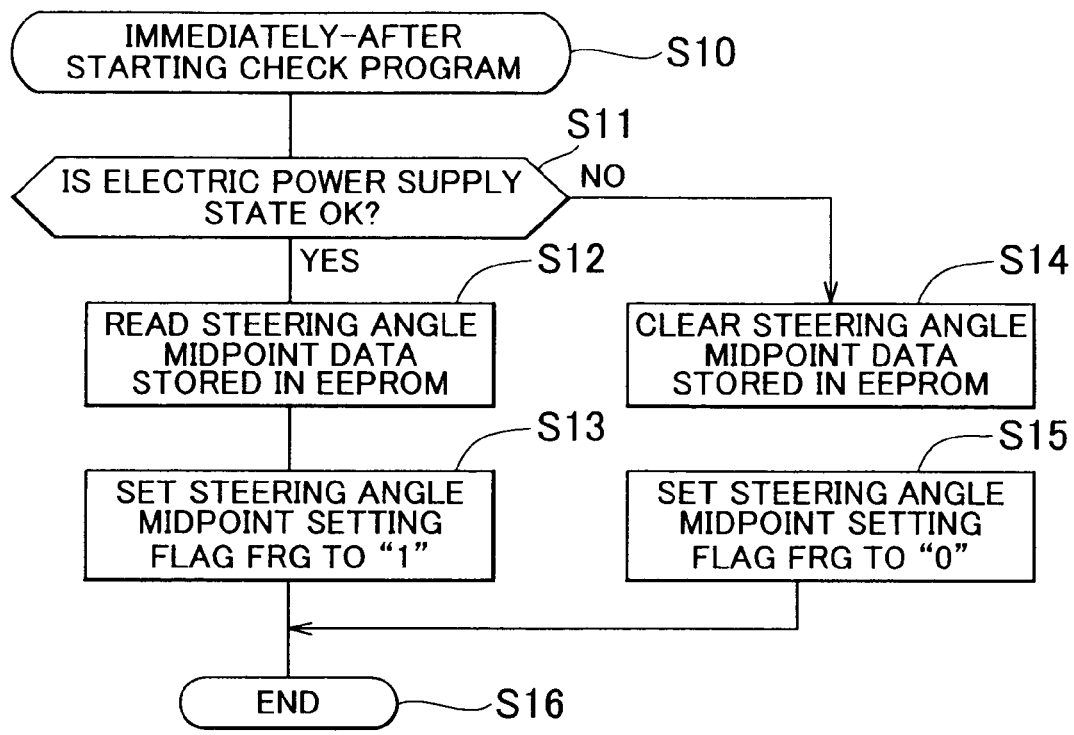
FIG. 3 is a flowchart showing an immediately-after-starting check program performed by a CPU shown in FIG. 2.

Next, an operation of the electric power steering system having the above-mentioned structure will be described in detail. When the driver changes the state of the ignition switch 22 from the OFF state to the ON state, the CPU 11 starts an immediately-after-starting check program shown in FIG. 3, in step S10. After starting the program in step S10, the CPU 11 checks a state of electric power supply from the battery 50. The CPU 11 receives, for example, a detection signal from a voltage sensor (not shown) which detects and outputs a voltage of the battery 50, and checks a present operating state (e.g. electromotive force) of the battery 50.

The CPU 11 also checks a connection/removal history of the battery 50. Detailed description concerning the checking process will be made. As mentioned above, electric power is constantly supplied from the battery 50 to the steering angle sensor 35, regardless of the state of the ignition switch 22. In this state, if the battery 50 is removed due to, for example, replacement of the battery 50, electric power supply to the steering angle sensor 35 is interrupted. At this time, the steering angle sensor 35 temporarily stores interruption information indicating that electric power supply is interrupted in, for example, non-volatile memory (not shown) included in the steering angle sensor 35. When the battery 50 is connected again, the steering angle sensor 35 outputs the interruption information stored in the CPU 11 via the input interface 12. Thus, the CPU 11 can check whether the battery 50 has been removed and then connected again.

If it is determined in step S11 that the operating state of the battery 50 is good and there is no connection/removal history, the CPU 11 makes an affirmative determination since the state of electric power supply is good, and performs step S12. If the state of electric power supply is good, the battery 50 continuously and appropriately supplies electric power during a period from when the vehicle finishes running last time, that is, from when the ignition switch 22 is turned OFF until when the vehicle starts running this time, that is, until when the ignition switch 22 is turned ON (hereinafter, the state during this period will be referred to as a "parking state"). In step S12, the CPU 11 reads a control steering angle midpoint that is computed by performing a steering angle midpoint computing program, which will be described later and that is stored in the EEPROM 14 while the vehicle is running last time. Even in the parking state, since electric power is continuously and appropriately supplied from the battery 50 to the EEPROM 14, the control steering angle midpoint is stored with a certain degree of reliability. Therefore, the CPU 11 tentatively sets the control steering angle midpoint for the early stage of starting of the present running process to the control steering angle midpoint that is read from the EEPROM 14, and that is set while the vehicle is running last time (hereinafter, this control steering angle midpoint will be referred to as the "previous control steering angle midpoint"). The CPU 11 then performs step S13. Here, the control steering angle midpoint is a reference point that is used when the steering angle sensor 35 detects the steering angle θ, and is indicated by a turning position of the steering shaft 33. Each time the control steering angle midpoint is newly set, the CPU 11 temporarily stores the newly set control steering angle midpoint in RAM (not shown). In step S13, the CPU 11 sets a value of a steering angle midpoint setting flag FRQ, which indicates whether the control steering angle midpoint has been set, to "1" that indicates that the control steering angle midpoint has been set. In step S16, the CPU 11 ends the immediately-after-starting check program.

In the state where the value of the steering angle midpoint setting flag FRG is set to "1" by performing the immediately-after-starting check program, the control steering angle midpoint for the early stage of starting of the present running process is tentatively set to the previous control steering angle midpoint. However, if the vehicle state (e.g. the number of occupants and a laden weight) during the last running process is different from the present vehicle state, the previous control steering angle midpoint that is tentatively set by the CPU 11 may be inappropriate for the present vehicle state. Accordingly, the CPU 11 sets the motor current value I MOTR corresponding to the steering angle θ based on a steering angle-motor current value characteristic indicated by a solid line (hereinafter, this characteristic will be referred to as an "initial characteristic") in FIG. 4, not based on a steering angle-motor current value characteristic indicated by a dashed line (hereinafter, this characteristic will be referred to as a "normal characteristic") in FIG. 4. The CPU 11 then controls turning force (assisting force) supplied by the electric motor 30.

Figure 4:
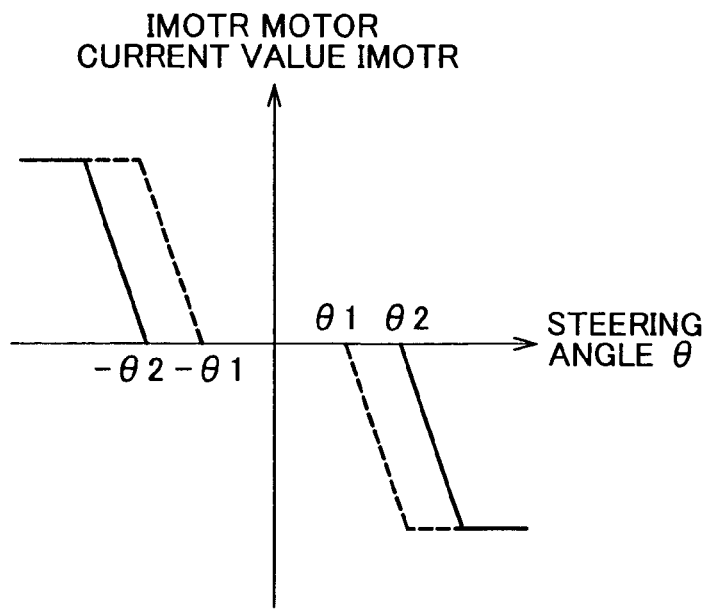
FIG. 4 is a graph showing a steering angle-motor current value characteristic used for controlling driving of an electric motor.

Control of the assisting force based on the initial characteristic is performed such that the predetermined motor current value I MOTR is applied to the electric motor 30 when the steering angle θ exceeds a second steering angle θ2 that is larger than an absolute value of a predetermined first steering angle θ1 in the normal characteristic, as shown in FIG. 4. In other words, the CPU 11 sets a range in which the motor current value I MOTR is not applied to the electric motor 30 (hereinafter, this range will be referred to as a "dead zone") to a range wider than that in the normal control, based on the detected steering angle θ. The motor current value I MOTR is not applied to the electric motor 30 until the steering angle θ becomes equal to the predetermined second steering angle θ2. Thus, even when the driver adjusts the turning position of the steering wheel 31 as required since the previous control steering angle midpoint is not appropriate and the neutral position of the steering wheel 31 deviates from the appropriate neutral position by a certain amount, the motor current value I MOTR is maintained at "0". Thus, the electric motor 30 is prohibited from supplying the assisting force corresponding to the detected steering angle θ to the steering shaft 33, whereby the driver does not feel a sense of discomfort.

On the other hand, when it is determined in step S11 that the operating state of the battery 50 is not good, or that there is a connection/removal history even if the operating state is good, the CPU 11 makes a negative determination since the state of electric power supply from the battery 50 is not good. Then, the CPU 11 performs step S14. When the state of electric power supply from the battery 50 is not good, it is highly possible that the battery 50 does not supply electric power continuously and appropriately in the parking state. Therefore, the control steering angle midpoint is stored in the EEPROM 14 with low reliability. Accordingly, in step S14, the CPU 11 clears the control steering angle midpoint stored in the EEPROM 14, and performs step S15. In step S15, the CPU 11 sets the value of the steering angle midpoint setting flag FRG to "0" which indicates that the control steering angle midpoint has not been set. Then, the CPU 11 ends the immediately-after-starting check program in step S16.

Figure 5:
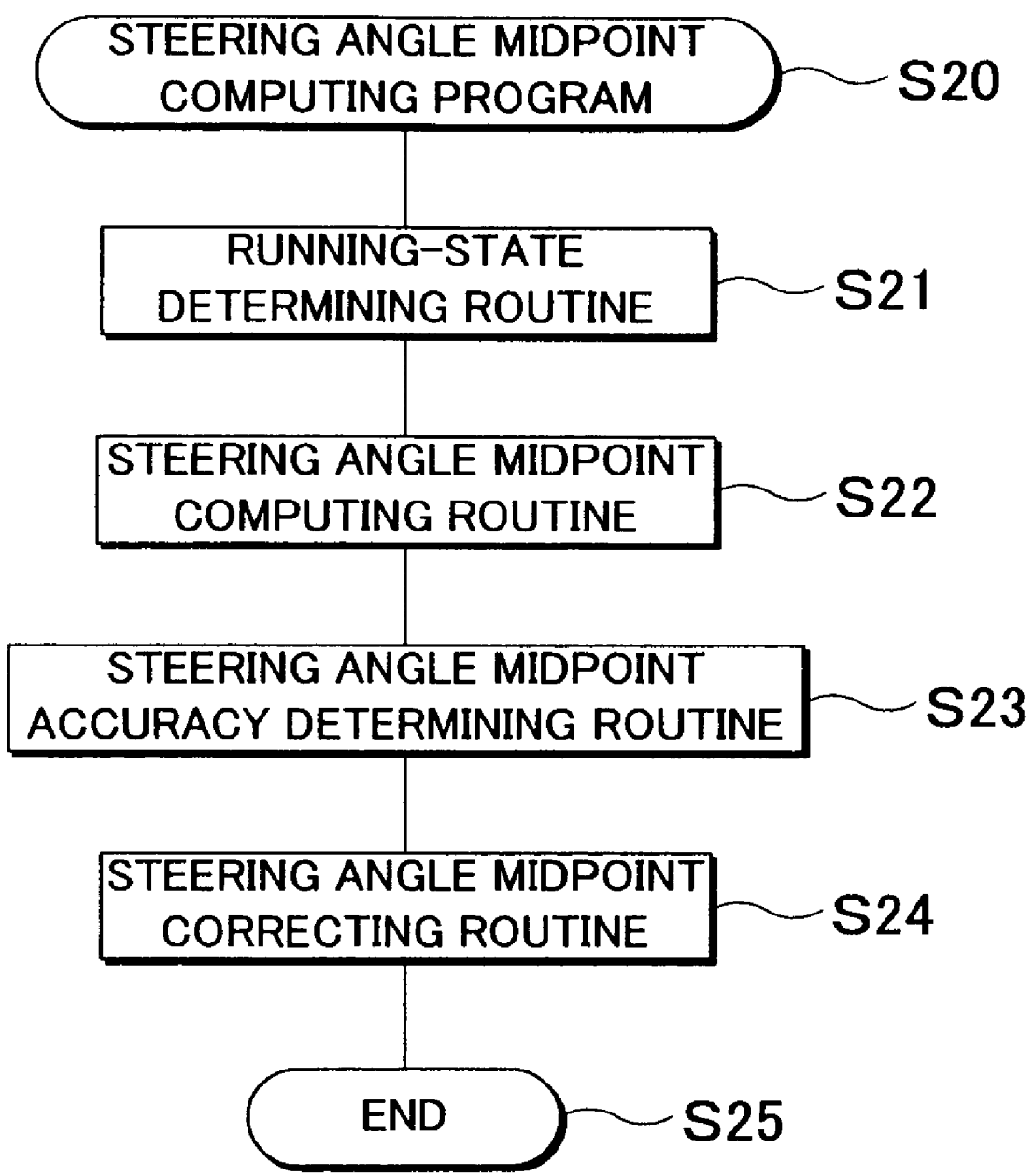
FIG. 5 is a flowchart showing a steering angle midpoint computing program performed by the CPU shown in FIG. 2.

Next, a steering angle midpoint computing program for computing a control steering angle midpoint appropriate for the present running process will be described in detail. FIG. 5 shows steps of the steering angle midpoint computing program that is repeatedly performed by the CPU 11 at predetermined intervals.

When the driver change the state of the ignition switch 22 from the OFF state to the ON state, the CPU 11 performs the immediately-after-starting check program, and then starts the steering angle midpoint computing program shown in FIG. 5 at a predetermined time in step S20. In step S21, the CPU 11 performs a straight-running state determining routine for determining whether the vehicle is presently running straight.

Figure 6:
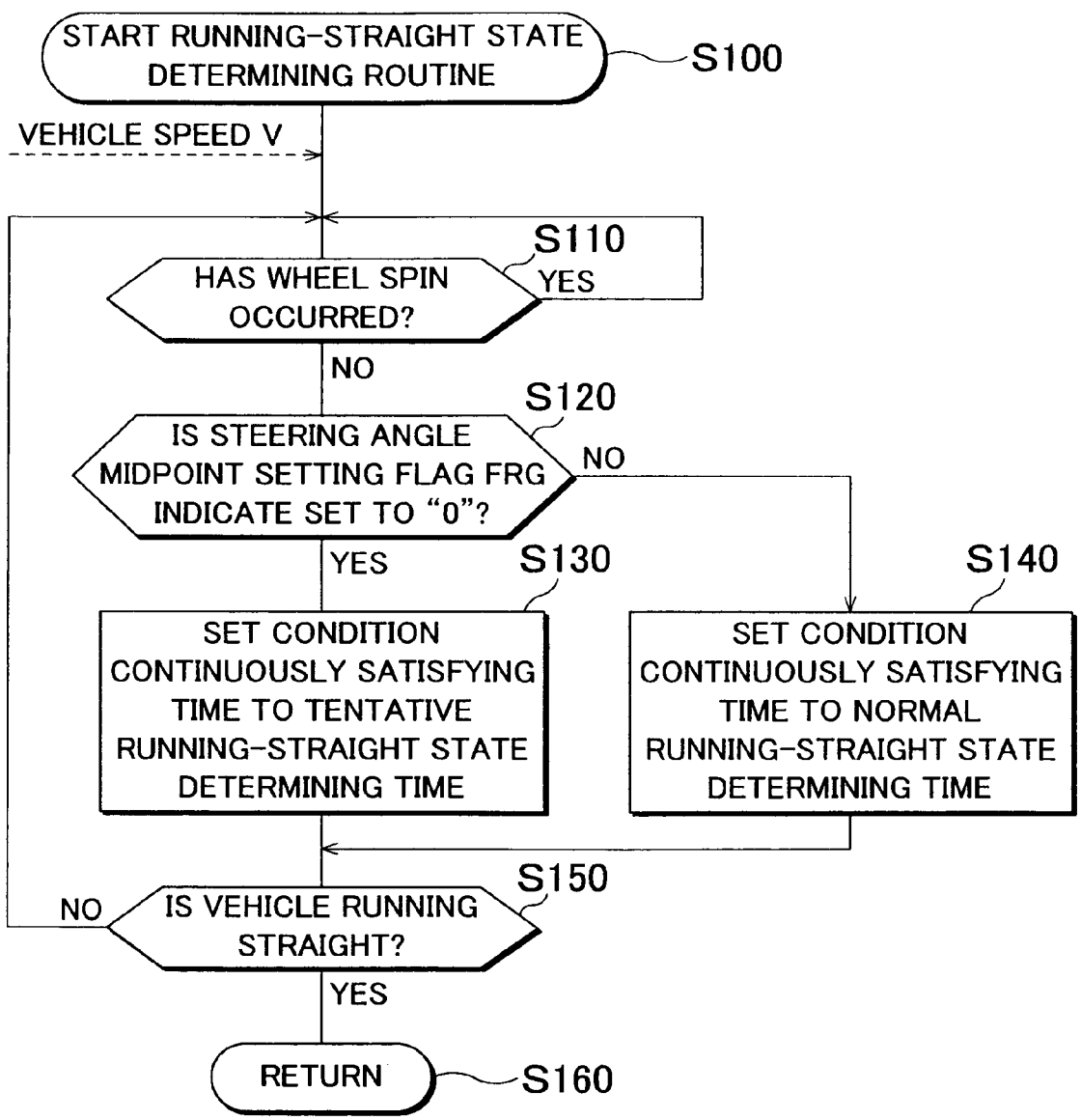
FIG. 6 is a flowchart showing a straight-running state determining routine performed by the CPU shown in FIG. 2.

The straight-running state determining routine is started in step S100, as shown in FIG. 6. The CPU 11 receives the vehicle speed V detected by the vehicle speed sensor 41, and determines in step S110 whether wheel spin has occurred in the vehicle. At this time, the CPU 11 determines whether wheel spin has occurred based on acceleration that is calculated based on the received vehicle speed V. Detailed description concerning the determination will be made. The CPU 11 calculates the present acceleration of the vehicle by, for example, differentiating the vehicle V with respect to time. When a condition that the calculated acceleration continues for a predetermined time or longer at a predetermined value is satisfied (hereinafter, this condition will be referred to as a "wheel spin determination condition"), the CPU 11 determines that wheel spin has occurred in the vehicle.

In the determining process in step S110, as long as the calculated acceleration satisfies the wheel spin determination condition, the CPU 11 repeatedly makes an affirmative determination. Until the state where the calculated acceleration does not satisfy the wheel spin determination condition is realized, the CPU 11 repeatedly performs step S110. When wheel spin has occurred in the vehicle, erroneous detection of the steering angle θ in a straight-running state determination, which will be described later, can be reduced effectively by repeatedly performing step S110. Namely, in the state where wheel spin has occurred in the vehicle, the driver may turn the steering wheel 31 clockwise or counter-clockwise in order to stabilize the running state of the vehicle. However, it is highly possible that this turning operation is performed in the state where the vehicle is not actually running straight due to the wheel spin. Accordingly, if the steering angle θ detected in the state where wheel spin has occurred is used for the determination whether the vehicle is running straight, an accurate determination may not be made. However, if the straight-running state determination process is prohibited in the state where wheel spin has occurred in the vehicle, it is possible to considerably accurately determine whether the vehicle is running straight.

If it is determined in step S110 that wheel spin has not occurred in the vehicle, the CPU 11 makes a negative determination, and performs step S120. In step S120, the CPU 11 determines whether the steering angle midpoint setting flag FRG, which is set by performing the immediately-after-starting check program, indicates "0". If the steering angle midpoint setting flag FRG indicates "0", that is, if the control steering angle midpoint has not been set, the CPU 11 makes an affirmative determination, and performs step S130. In step S130, the CPU 11 sets the time, in which a condition for determining whether the vehicle is running straight (hereinafter, this condition will be referred to as a "straight-running state determination condition") needs to be continuously satisfied, to a short time (hereinafter, this short time will be referred to as a "tentative straight-running state determination time") in order to set the control steering angle midpoint promptly, even if the control steering angle midpoint is used tentatively. After setting the tentative straight-running state determination time, the CPU 11 performs step S150.

On the other hand, if it is determined in step S120 that the value of the steering angle midpoint setting flag FRG is set to "1", the CPU 11 makes a negative determination, and performs step S140. In step S140, the CPU 11 sets the time, in which the straight-running state determination condition needs to be continuously satisfied, to a long time (hereinafter, this long time will be referred to as a "normal straight-running state determination time") in order to increase the accuracy of the tentatively set control steering angle midpoint. After setting the normal straight-running state determination time, the CPU 11 performs step S150.

In step S150, the CPU 11 determines whether the vehicle is running straight based on the straight-running state determination condition. The determination as to whether the vehicle is running straight will be described in detail. The straight-running state determination condition includes three conditions. The three conditions are a condition that an amount of change in the steering angle θ detected by the steering angle sensor 35 is equal to or smaller than a predetermined small change amount αdeg, a condition that the vehicle speed V detected by the vehicle speed sensor 41 is equal to or higher than a predetermined vehicle speed β Km/h, and a condition that an axial force F serving as acting force that acts on the rack bar 34 is in a predetermined narrow range from −γNm to +γNm. When the straight-running state condition formed of the above three conditions continues to be satisfied during the tentative straight-running state determination time set in step S130 or the normal straight-running state determination time set in step S140, the CPU 11 determines that the vehicle is running straight.

Detailed description concerning the determination will be made. The CPU 11 receives the detected steering angle θ that is the present turning angle of the steering shaft 33 from the steering angle sensor 35 via the input interface 12. The CPU 11 receives the present vehicle speed V from the vehicle speed sensor 41 via the input interface 12. The CPU 11 receives steering torque MT that presently acts on the steering shaft 33 from the steering torque sensor 42 via the input interface 12. In addition, the CPU 11 receives the inter-motor-terminal voltage Vt of the electric motor 30 via the input interface 12, and detects the voltage at each of both ends of the resistance 20*b* of the drive circuit 20, thereby detecting the motor current value I MOTR of the electric motor 30. The CPU 11 calculates assist torque AT generated by the electric motor 30, based on the detected motor current value I MOTR of the electric motor 30. The CPU 11 combines the steering torque MT with the assist torque AT, thereby calculating the axial force F of the rack bar 34 as resultant force that matches external force (self-alignment torque) transmitted from the right and left front wheels FW1 and FW2.

The CPU 11 determines whether the received steering angle θ, the received vehicle speed V, and the calculated axial force F satisfy the above-mentioned three respective conditions forming the straight-running state determination condition, thereby determining whether the straight-running state determination condition has been satisfied. Namely, the CPU 11 determines whether an amount of change (deviation) in the steering angle, which is calculated based on the received steering angle θ is equal to or smaller than the predetermined small change amount αdeg, whether the received vehicle speed V is equal to or higher than the predetermined vehicle speed βKm/h, and whether the calculated axial force F is in the predetermined narrow range from −γNm to +γNm. If each of these values satisfies the straight-running state determination condition, the CPU 11 determines whether the straight-running state determination condition continues to be satisfied during the tentative straight-running state determination time or the normal straight-running state determination time. If it is determined that the straight-running state determination condition continues to be satisfied during the tentative straight-running state determination time or the normal straight-running state determination time, the CPU 11 makes an affirmative determination, and ends the routine in step S160. On the other hand, when it is determined that the straight-running state determination condition does not continue to be satisfied during the tentative straight-running state determination time or the normal straight-running state determination time, the CPU 11 makes a negative determination, and performs steps S110 to S140 again. Until making an affirmative determination in step S150, the CPU 11 repeatedly performs the above-mentioned steps S110 to S140.

Figure 7A:
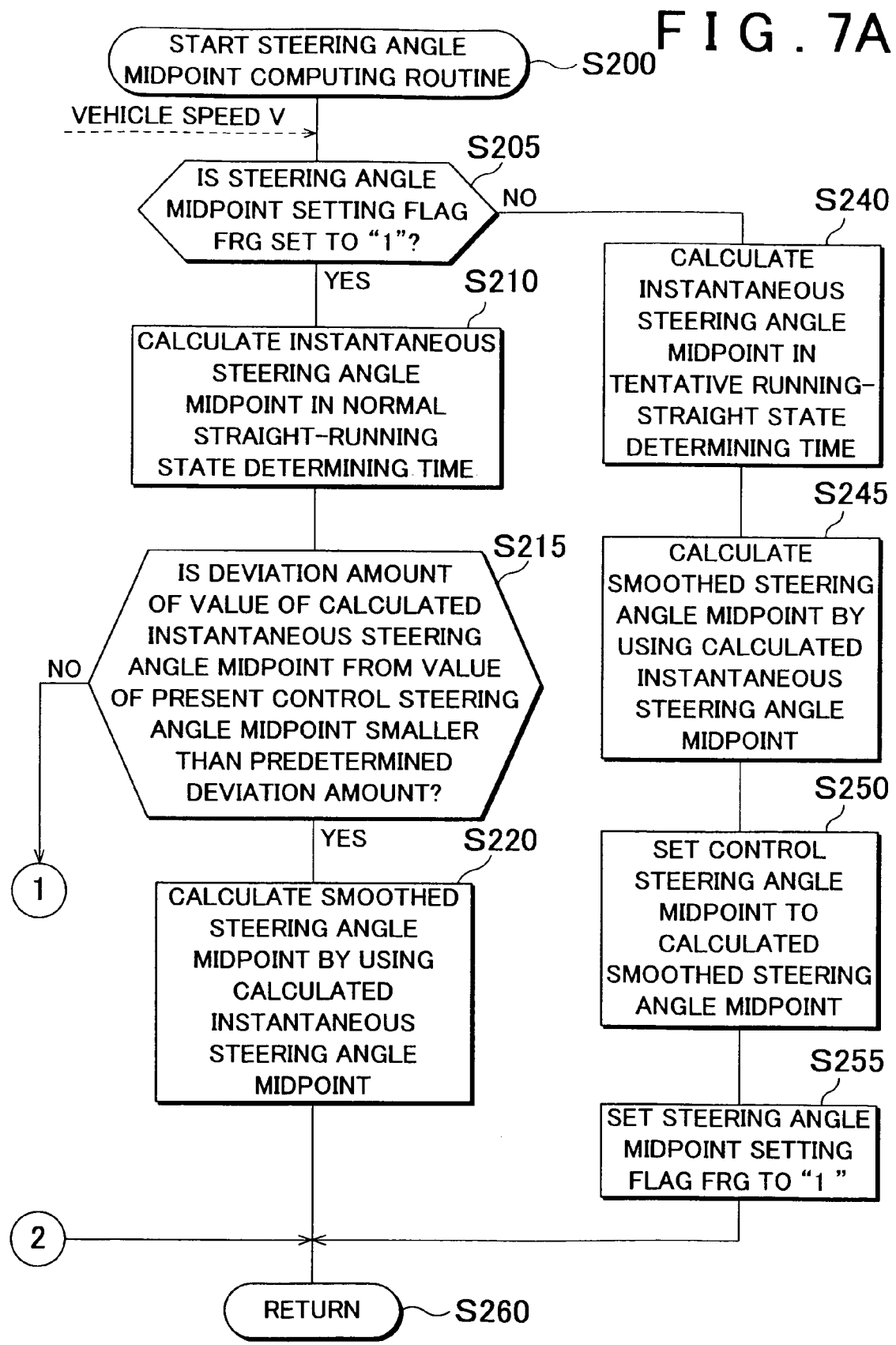
FIG. 7A and FIG. 7B are a flowchart showing a steering angle midpoint computing routine performed by the CPU shown in FIG. 2.
Figure 7B:
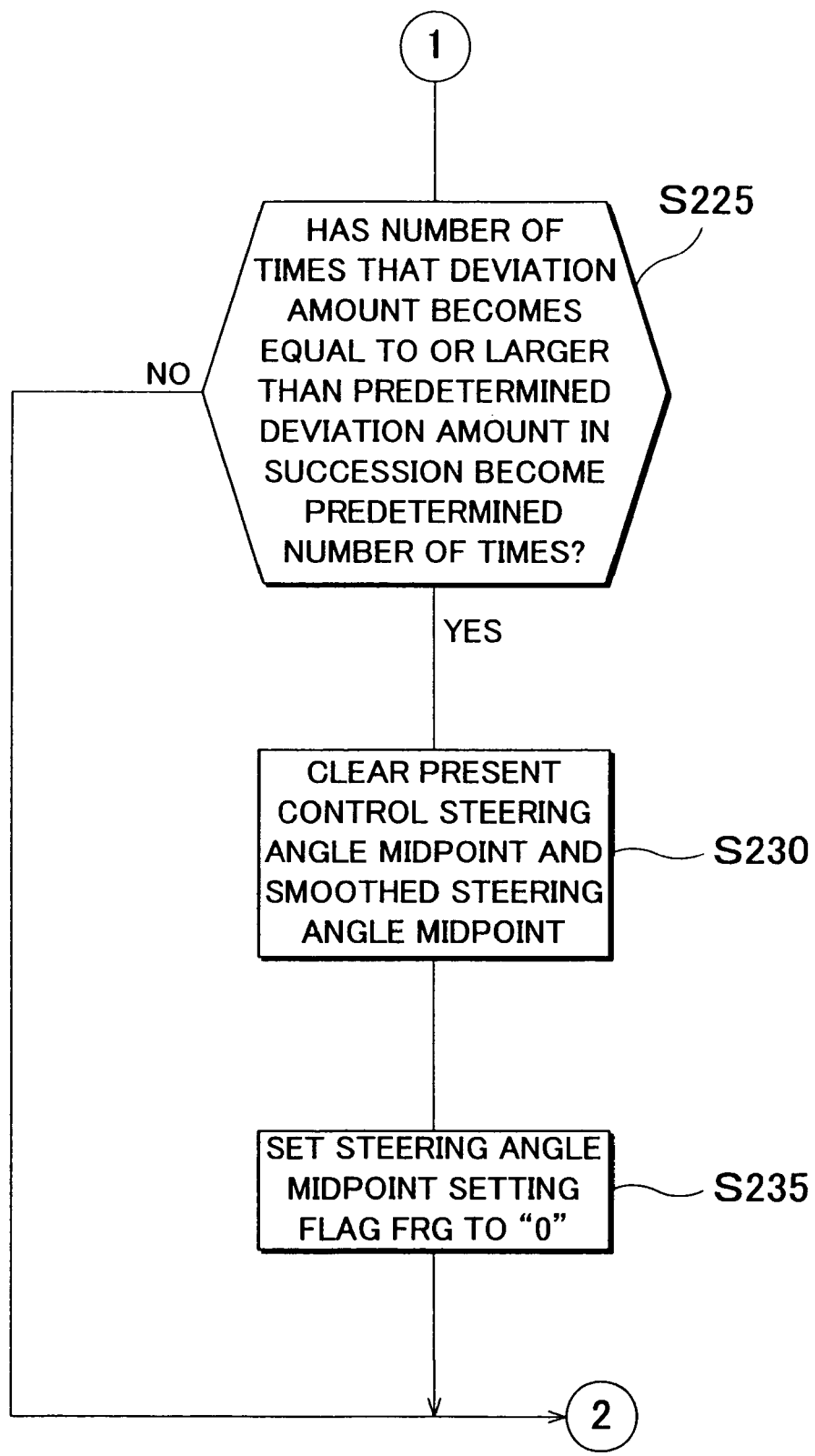

The steering angle midpoint computing program shown in FIG. 5 will be described again. After performing the straight-running state determining routine in step S21, the CPU 11 performs a steering angle midpoint computing routine in step S22. The steering angle midpoint computing routine is started in step S200, as shown in FIG. 7A and FIG. 7B. The CPU 11 receives the vehicle speed V from the vehicle speed sensor 41, and determines in step S205 whether the value of the steering angle midpoint setting flag FRG has been set to "1". If the value of steering angle midpoint setting flag FRG has been set to "1", the CPU 11 makes an affirmative determination, and performs step S210. In step S210, the CPU 11 calculates an instantaneous steering angle midpoint according to a following equation 1. The instantaneous steering angle midpoint is an average value of the steering angles θ detected by the steering angle sensor 35 in the normal straight-running state determination time, that is, a first steering angle midpoint.

Instantaneous steering angle midpoint=accumulated value of steering angles θ detected in normal straight-running state determination time/normal straight-running state determination time   Equation 1

Then, while determining that the vehicle is running straight, the CPU 11 continues calculating the instantaneous steering angle midpoint in each normal straight-running state determination time, and temporarily stores the calculated plural instantaneous steering angle midpoints in the RAM (not shown) sequentially.

After calculating the instantaneous steering angle midpoint in step S210, the CPU 11 compares a value of the calculated instantaneous steering angle midpoint with a value of the presently set control steering angle midpoint in step S215, and determines whether an amount of deviation of the value of the calculated instantaneous steering angle midpoint from the value of the presently set control steering angle midpoint is smaller than a predetermined deviation amount λ.

When the amount of deviation of the value of the instantaneous steering angle midpoint calculated in step S210 from the value of the presently set control steering angle midpoint is smaller than the predetermined deviation amount λ, the CPU 11 makes an affirmative determination, and performs step S220.

In step S220, the CPU 11 calculates a smoothed steering angle midpoint. The smoothed steering angle midpoint is a steering angle midpoint that is obtained by filtering the instantaneous steering angle midpoint calculated in step S210, that is, a second steering angle midpoint. Hereafter, calculation of the smoothed steering angle midpoint will be described in detail. When the vehicle speed V is high, that is, when the vehicle is running at a high speed, it is easy for the vehicle to keep running straight, as compared with the case where the vehicle speed V is low, that is, the vehicle is running at a low speed. Namely, as the vehicle speed V increases, it becomes easier to maintain the right and left front wheels FW1 and FW2 at positions for running straight due to an effect of self-alignment torque, and it becomes easier for the vehicle to keep running straight. As a result, a deviation between the instantaneous steering angle midpoints calculated according to the equation 1 in step S210 becomes smaller, and the reliability of the calculated instantaneous steering angle midpoint is improved.

Accordingly, the CPU 11 changes weights (weighting factors) of the instantaneous steering angle midpoint calculated according to the equation 1, and the smoothed steering angle midpoint that is calculated when the steering angle midpoint computing routine is performed last time (hereinafter, this smoothed steering angle midpoint will be referred to as the "previous smoothed steering angle midpoint"), and performs a filtering process, thereby calculating the present smoothed steering angle midpoint. Namely, if the vehicle speed V received from the vehicle speed sensor 41 is lower than a predetermined vehicle speed Vo, the CPU 11 calculates the smoothed steering angle midpoint according to a following equation 2. If the vehicle speed V is equal to or higher than the predetermined vehicle speed Vo, the CPU 11 calculates the smoothed steering angle midpoint according to a following equation 3.

Smoothed steering angle midpoint={previous smoothed steering angle midpoint×$(j-1)$+present instantaneous steering angle midpoint}/$j$    Equation 2

Smoothed steering angle midpoint={previous smoothed steering angle midpoint×$(k-1)$+present instantaneous steering angle midpoint}/$k$    Equation 3

Note that, "j" in the equation 2 and "k" in the equation 3 are predetermined positive integral numbers, and "j" is larger than "k" ("j">"k"). The CPU 11 temporarily stores the present steering angle midpoint calculated according to the equation 2 or the equation 3 in the RAM, and ends the steering angle midpoint computing routine in step S260.

On the other hand, when it is determined in step S215 that the amount of deviation of the value of the instantaneous steering angle midpoint calculated in step S210 from the value of the presently set control steering angle midpoint is equal to or larger than the predetermined deviation amount λ, the CPU 11 makes a negative determination, and performs step S225. In step S225, the CPU 11 determines whether the number of times that the amount of deviation of the value of the instantaneous steering angle midpoint calculated in step S210 from the value of the presently set control steering angle midpoint becomes equal to or larger than the predetermined deviation amount λ in succession has become a predetermined number of times (e.g. three times). When it is determined that the number of times that the amount of deviation becomes equal to or larger than the predetermined deviation amount λ in succession has become the predetermined number of times, the presently set control steering angle midpoint may be wrong. Accordingly, the CPU 11 makes an affirmative determination, and performs step S230.

In step S230, the CPU 11 clears the present control steering angle midpoint and the smoothed steering angle midpoint that are stored in the RAM. As mentioned above, if the number of times that the amount of deviation of the value of the calculated instantaneous steering angle midpoint from the value of the presently set control steering angle midpoint becomes equal to or larger than the predetermined deviation amount λ in succession has become the predetermined number of times, it is highly possible that the presently set control steering angle midpoint is wrong. Accordingly, the CPU 11 clears the present control steering angle midpoint stored in the RAM in order to stop controlling the electric motor 30 based on the presently set control steering angle midpoint. When the present control steering angle midpoint is cleared, the smoothed steering angle midpoint needs to be calculated by using the instantaneous steering angle midpoint in the tentative straight-running state determination time, and the control steering angle midpoint needs to be set promptly, as described later. Accordingly, the CPU 11 clears the smoothed steering angle midpoint stored in the RAM (more specifically, the smoothed steering angle midpoint that is calculated by using the instantaneous steering angle midpoint in the normal straight-running state determination time). After clearing the present control steering angle midpoint and the smoothed steering angle midpoint stored in the RAM, the CPU 11 performs step S235. In step S235, the CPU 11 sets the value of the steering angle midpoint setting flag FRG to "0" since the presently set control steering angle midpoint is cleared in step S230. The CPU 11 then ends the steering angle midpoint computing routine in step S260.

On the other hand, if it is determined in step S225 that the number of times that the amount of deviation becomes the predetermined deviation amount λ in succession has not become the predetermined number of times, the CPU 11 makes a negative determination, and ends the steering angle midpoint computing routine in step S260. In this case, for example, when the vehicle is running on a road inclined in the width direction, the instantaneous steering angle midpoint calculated in step S210 may be wrong. Accordingly, when the amount of deviation of the value of the calculated instantaneous steering angle midpoint from the value of the presently set control steering angle midpoint is equal to or larger than the predetermined deviation amount λ, the CPU 11 does not employ this instantaneous steering angle midpoint for calculation of the smoothed steering angle midpoint, and ends the steering angle midpoint computing routine. The accuracy of calculation of the smoothed steering angle midpoint can be improved by excluding the instantaneous steering angle midpoint. Also, as described later, the accuracy of calculation of the control steering angle midpoint to be updated by using the smoothed steering angle midpoint can be also improved. In addition, for example, the steering angle θ that is erroneously detected by the steering angle sensor 35 can be effectively eliminated by excluding the instantaneous steering angle midpoint that is deviated from the presently set control steering angle midpoint by the predetermined deviation amount λ or more. As a result, the accuracy of calculation of the smoothed steering angle midpoint and the control steering angle midpoint can be improved.

It is determined in step S205 that the value of the steering angle midpoint setting flag is set to "0", the CPU 11 makes a negative determination, and performs step S240. In step S240, the CPU 11 calculates an instantaneous steering angle midpoint according to a following equation 4. The instantaneous steering angle midpoint is an average value of the steering angles θ detected by the steering angle sensor 35 in the tentative straight-running state determination time, that is, a first steering angle midpoint.

Instantaneous steering angle midpoint=accumulated value of steering angles θ detected in tentative straight-running state determination time/tentative straight-running state determination time     Equation 4

While determining that the vehicle is running straight, the CPU 11 continues calculating the instantaneous steering angle midpoint in each tentative straight-running state determination time, and temporarily stores the calculated plural instantaneous steering angle midpoints in the RAM sequentially.

After calculating the instantaneous steering angle midpoint in step S240, the CPU 11 calculates a smoothed steering angle midpoint as a second steering angle midpoint in step S245 by using the calculated instantaneous steering angle midpoint. Hereafter, calculation of the smoothed steering angle midpoint by using the instantaneous steering angle midpoint in the tentative straight-running state determination time will be described in detail. In this case, the CPU 11 calculates the smoothed steering angle midpoint by filtering (averaging) the instantaneous steering angle midpoints in the tentative straight-running state determination time according to a following equation 5.

Smoothed steering angle midpoint={smoothed steering angle midpoint calculated last time×((number of times "$m$" that instantaneous steering angle midpoint is calculated)−"1"("$m$"−1))+present instantaneous steering angle midpoint}/number of times "$m$" that instantaneous steering angle midpoint is calculated     Equation 5

Note that, "$m$" in the equation 5 is a predetermined positive integral number.

Figure 8:
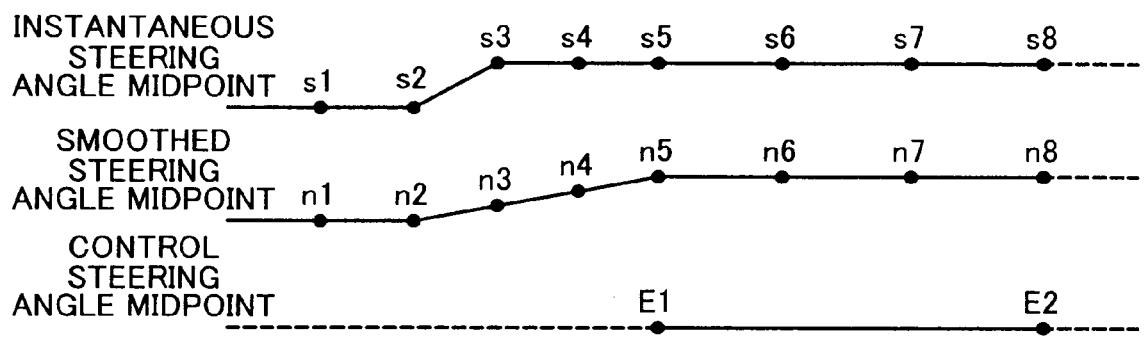
FIG. 8 is a view for describing how an instantaneous steering angle midpoint, a smoothed steering angle midpoint, and a control steering angle midpoint are calculated and set.

Hereafter, the smoothed steering angle midpoint calculated according to the equation 5 will be described in detail with reference to FIG. 8. FIG. 8 schematically shows transitions of the instantaneous steering angle midpoint, the smoothed steering angle midpoint, and the control steering angle midpoint. If the number of times "$m$" in the equation 5 is set to, for example, "5" ("$m$"=5), the CPU 11 calculates smoothed steering angle midpoints n1, n2, n3, n4, and n5 according to the equation 5 by using instantaneous steering angle midpoints s1, s2, s3, s4, and s5 calculated according to the equation 4.

Hereafter, detailed description concerning the calculation will be made. In step S240, the CPU 11 calculates the smoothed steering angle midpoint n1 according to the equation 5 by using the instantaneous steering angle midpoint s1 temporarily stored in the RAM. In this case, since the number of times "$m$" that the instantaneous steering angle midpoint is calculated is "1", the smoothed steering angle midpoint n1 is equal to the instantaneous steering angle midpoint s1 (n1=s1). Similarly, if the vehicle continues running straight, the CPU 11 calculates the instantaneous steering angle midpoint s2 according to the equation 4, and temporarily stores the instantaneous steering angle midpoint s2 in the RAM. The CPU 11 then calculates the smoothed steering angle midpoint n2 according to the equation 5 by using the instantaneous steering angle midpoint s2. In this case, the smoothed steering angle midpoint calculated last time is the smoothed steering angle midpoint n1, and the number of times "$m$" that the instantaneous steering angle midpoint is calculated is "2". The smoothed steering angle midpoint n2 is calculated by using the smoothed steering angle midpoint n1 and the number of times "2". Then, the CPU 11 calculates the instantaneous steering angle midpoint s3 according to the equation 4, and temporarily stores the instantaneous steering angle midpoint s3 in the RAM. The CPU 11 calculates the smoothed steering angle midpoint n3 according to the equation 5 by using the instantaneous steering angle midpoint s3. In this case, the smoothed steering angle midpoint calculated last time is the smoothed steering angle midpoint n2, and the number of times "m" that the instantaneous steering angle midpoint is calculated is "3". The smoothed steering angle midpoint n3 is calculated by using the smoothed steering angle midpoint n2 and the number of times "3". In the same manner, the CPU 11 calculates the smoothed steering angle midpoints n4 and n5.

The smoothed steering angle midpoint obtained in this manner is calculated by averaging the smoothed steering angle midpoint calculated last time and the present instantaneous steering angle midpoint, as shown by the equation 5. Therefore, the accuracy of calculation can be improved according to the number of times that the averaging process is performed (i.e. according to the number of times "m" that calculating is performed). More specifically, the value of the smoothed steering angle midpoint n5 is close to the actual steering angle midpoint in the present vehicle state, as compared with the value of the smoothed steering angle midpoint n1. In other words, the value of the smoothed steering angle midpoint n5 is more accurate than the value of the smoothed steering angle midpoint n1.

After calculating the smoothed steering angle midpoint in step S245, the CPU 11 performs step S250. In step S250, the CPU 11 sets the control steering angle midpoint to the smoothed steering angle midpoint calculated for the "m"th time, among the plural smoothed steering angle midpoints calculated in step S245. Namely, if the number of times "m" that calculation is performed is set to "5" ("m"="5"), as mentioned above, the CPU 11 sets the control steering angle midpoint E1 to the smoothed steering angle midpoint n5, as shown in FIG. 8. The control steering angle midpoint that is set in the state where the value of the steering angle midpoint setting flag FRG is set to "0", that is, in the state where the control steering angle midpoint has not been set, is calculated based on the instantaneous steering angle midpoint in the tentative straight-running state determination time. In this case, since the control steering angle midpoint is calculated when the vehicle is running straight for a short time, the accuracy is somewhat lower than that of the control steering angle midpoint that is calculated based on the instantaneous steering angle midpoint in the normal straight-running state determination time. However, the control steering angle midpoint can be set promptly by calculating the control steering angle midpoint based on the instantaneous steering angle midpoint in the tentative straight-running state determination time. Accordingly, appropriate assisting force can be promptly supplied from the electric motor 30 to the steering shaft 33.

As mentioned above, it is easy for the vehicle to keep running straight in the case where the vehicle is running at a high speed, as compared with the case where the vehicle is running at a low speed. Accordingly, when the already set control steering angle midpoint is cleared, the CPU 11 may calculate the smoothed steering angle midpoint in step S245 by setting the value "m" in the equation 5 to a small value based on the vehicle speed V that is obtained when the control steering angle midpoint is cleared. For example, as shown in FIG. 8, if the already set control steering angle midpoint E1 is cleared immediately before an instantaneous steering angle midpoint s6 is calculated, the CPU 11 sets the number of times "m" to a value (e.g. "m"="3") that is smaller than the number of times "m", in the equation 5, that the instantaneous steering angle midpoint is calculated, and calculates smoothed steering angle midpoints n6, n7, and n8. In step S250, the CPU 11 sets a new control steering angle midpoint E2 to the calculated smoothed steering angle midpoint n8.

After setting the control steering angle midpoint in step S250, the CPU 11 performs step S255, and sets the value of the steering angle midpoint setting flag FRG to "1". The CPU 11 then ends the steering angle midpoint computing routine in step S260.

Figure 9:
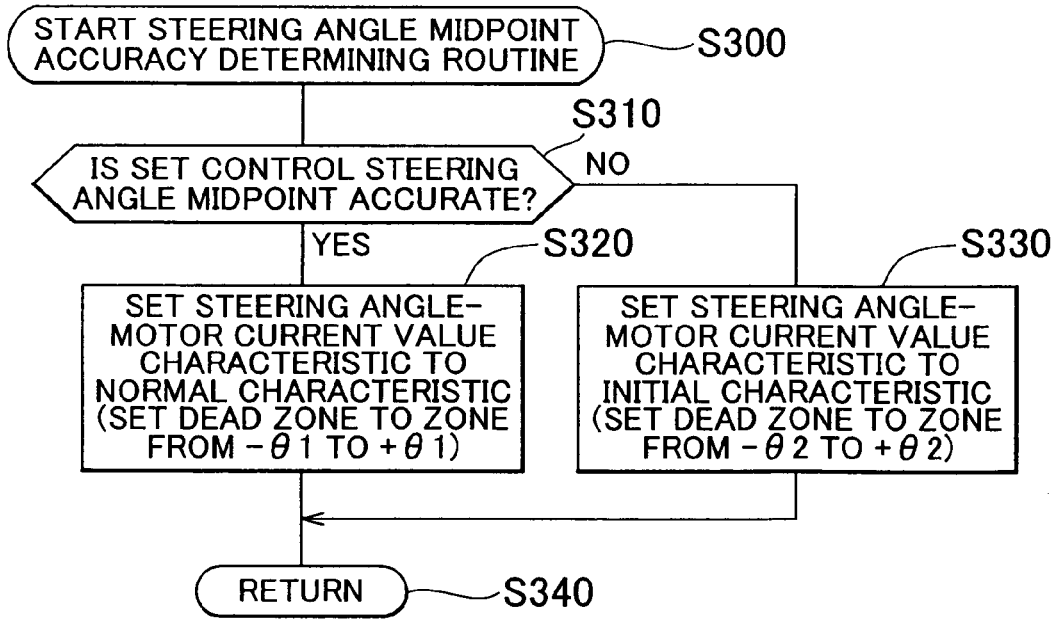
FIG. 9 is a flowchart showing a steering angle midpoint accuracy determining routine performed by the CPU shown in FIG. 2.

The steering angle midpoint computing program shown in FIG. 5 will be described again. After performing the steering angle midpoint computing routine in step S22, the CPU 11 performs a steering angle midpoint accuracy determining routine in step S23. As shown in FIG. 9, the steering angle midpoint accuracy determining routine is started in step S300. The CPU 11 determines in step S310 whether the control steering angle midpoint set by performing the steering angle midpoint computing routine is accurate based on an accuracy determination condition. In this case, the accuracy determination condition is formed of two conditions. The two conditions are a condition that the amount of deviation of the value of the presently set control steering angle midpoint from the value of the instantaneous steering angle midpoint calculated according to the equation 1 is smaller than a predetermined deviation amount μ, and a condition that the previous control steering angle midpoint has been updated as described later. Note that, the predetermined deviation amount μ is set to a value smaller than the above-mentioned predetermined deviation amount λ.

If one of these two conditions is satisfied, that is, the accuracy determination condition is satisfied, the presently set control steering angle midpoint is closer to the actual steering angle midpoint, that is, the presently set control steering angle is accurate. Accordingly, the CPU 11 makes an affirmative determination, and performs step S320. When the control steering angle midpoint is corrected by performing a steering angle midpoint correcting routine, which will be described later, the CPU 11 determines that the corrected control steering angle midpoint is accurate. In step S320, the CPU 11 sets the steering angle-motor current value characteristic to the normal characteristic shown in FIG. 4, and sets the dead zone for the detected steering angle θ to a narrow zone (more particularly, to the dead zone from −θ1 to +θ1 in FIG. 4). Namely, when the accuracy determination condition is satisfied, the control steering angle midpoint is a value closer to the steering angle midpoint for causing the vehicle to actually run straight. Therefore, the CPU 11 narrows the dead zone by setting the steering angle-motor current value characteristic to the normal characteristic, and enables the electric motor 30 to supply optimum and accurate assisting force to the turning operation of the steering wheel 31 performed by the driver. After performing step S320, the CPU 11 ends the steering angle midpoint accuracy determining routine in step S340.

On the other hand, when it is determined in step S310 that the accuracy determination condition is not satisfied since, for example, the vehicle state changes as the vehicle runs, the CPU 11 makes a negative determination, and performs step S330. In step S330, the CPU 11 sets the steering angle-motor current value characteristic to the initial characteristic, and sets the dead zone for the detected steering angle θ to a broad zone (more specifically, to the dead zone from −θ2 to +θ2 in FIG. 4). In the state where the vehicle state changes as the vehicle runs and the accuracy determination condition has not been satisfied, if the steering angle-motor current value characteristic continues to be set to the normal characteristic, the amount of deviation of the presently set control steering angle midpoint from the actual steering angle midpoint is large. Accordingly, unnecessary assisting force may be applied to the steering wheel 31. Therefore, the CPU 11 widens the dead zone by setting the steering angle-motor current value characteristic to the initial characteristic in step S330. After performing step S330, the CPU 11 ends the steering angle midpoint accuracy determining routine in step S340.

Figure 10:
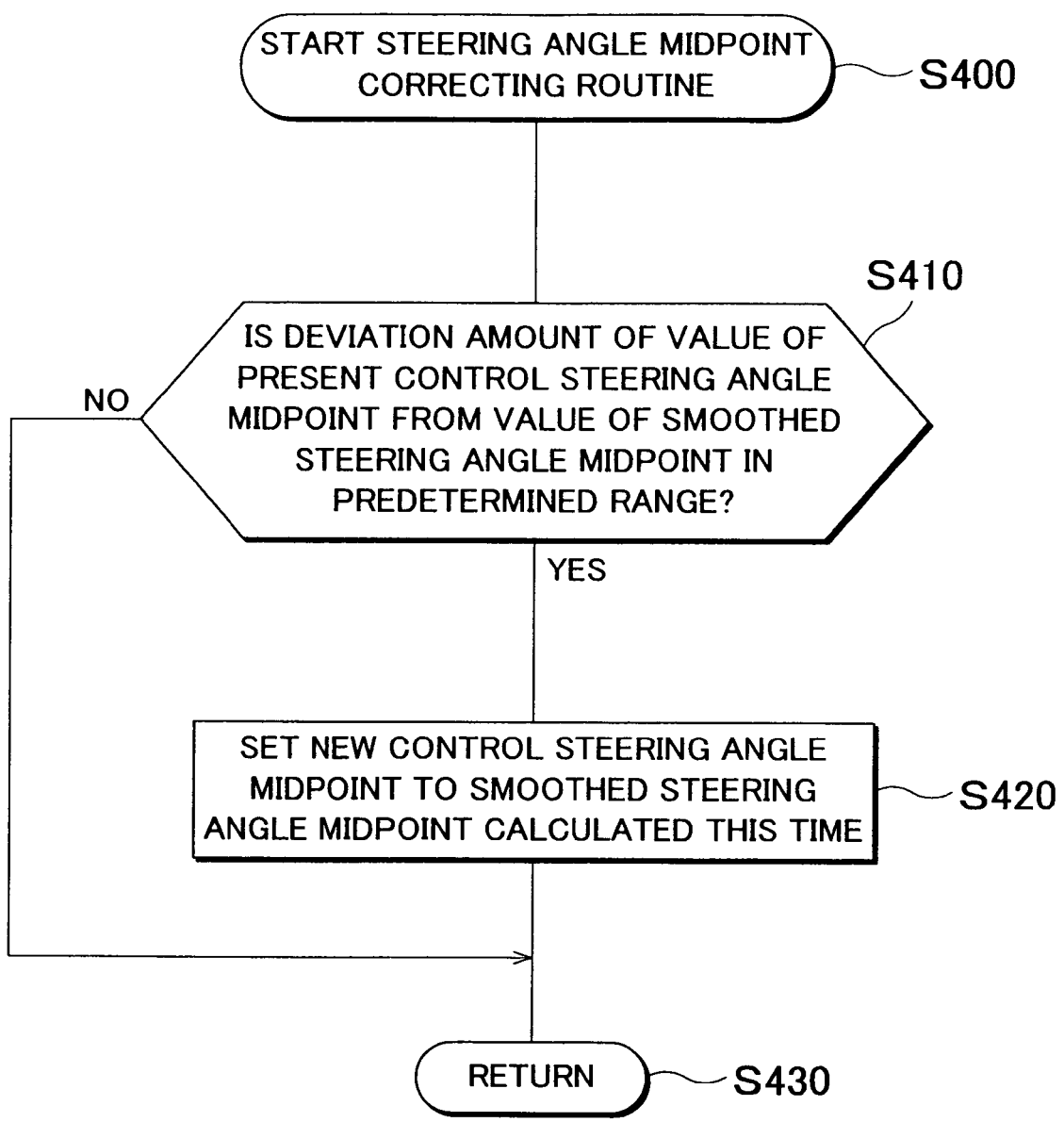
FIG. 10 is a flowchart showing a steering angle midpoint correcting routine performed by the CPU shown in FIG. 2.

The steering angle midpoint computing program shown in FIG. 5 will be described again. After performing the steering angle midpoint determining routine in step S23, the CPU 11 performs the steering angle midpoint correcting routine in step S24. The steering angle midpoint determining routine is started in step S400, as shown in FIG. 10. In step S410, the CPU 11 determines whether the amount of deviation of the value of the presently set control steering angle midpoint from the value of the calculated smoothed steering angle midpoint is in a predetermined range (e.g. whether the amount of deviation is a value equal to or larger than the above-mentioned predetermined deviation amount μ and smaller than the predetermined deviation amount λ).

When it is determined that the amount of deviation of the value of the presently set control steering angle midpoint from the value of the smoothed steering angle midpoint calculated this time is in the predetermined range, the CPU 11 makes an affirmative determination, and performs step S420. In step S420, the CPU 11 sets a new control steering angle midpoint to the smoothed steering angle midpoint calculated this time. When the amount of the deviation of the value of the presently set control steering angle midpoint from the value of the smoothed steering angle midpoint calculated this time is in the predetermined range, in other words, when the value of the smoothed steering angle midpoint calculated this time is deviated from the value of the presently set control steering angle midpoint by an amount in the predetermined range, the smoothed steering angle midpoint the value calculated this time is closer to the actual steering angle midpoint for causing the vehicle to run straight. More specifically, the smoothed steering angle midpoint calculated according to the equation 2 or the equation 3 is calculated when it is determined that the vehicle is running straight for a long time, that is, for the normal straight-running state determination time. Therefore, the calculated smoothed steering angle midpoint is a value that reflects the actual straight-running state of the vehicle more accurately, that is, a value having high reliability. Accordingly, when the amount of deviation of the value of the present control steering angle midpoint from the value of the calculated smoothed steering angle midpoint becomes an amount in the predetermined range, the CPU 11 sets the new control steering angle midpoint to the smoothed steering angle midpoint calculated this time.

The smoothed steering angle midpoint calculated according to the equation 5 by using the instantaneous steering angle midpoint in the tentative straight-running state determination time is, as mentioned above, calculated in order to set the control steering angle midpoint promptly. In this case, if the control steering angle midpoint is set based on the smoothed steering angle midpoint, the value of the steering angle midpoint setting flag FRG is set to "1". Accordingly, when the steering angle midpoint correcting routine is performed next time and thereafter, the smoothed steering angle midpoint in the normal straight-running state determination time is calculated. Accordingly, in this case as well, as mentioned above, if it is determined in step S410 that the amount of deviation of the value of the presently set control steering angle midpoint from the value of the smoothed steering angle midpoint calculated this time is an amount in the predetermined range, the CPU 11 makes an affirmative determination, and performs step S420. In step S420, the CPU 11 sets the new control steering angle midpoint to the smoothed steering angle midpoint calculated this time.

On the other hand, if it is determined in step S410 that the amount of deviation of the value of the presently set control steering angle midpoint from the value of the smoothed steering angle midpoint calculated this time is not in the predetermined range, the CPU 11 makes a negative determination, and ends the steering angle midpoint correcting routine in step S430. In this case, the amount of deviation is a value lower than the lower limit (e.g. the predetermined deviation amount μ) of the predetermined range. Namely, when the amount of deviation is a value equal to or higher than the upper limit (e.g. the predetermined deviation amount λ) of the predetermined range, as is clear from the equation 2 or the equation 3, at least the value of the calculated instantaneous steering angle midpoint needs to be equal to or higher than, for example, the predetermined deviation amount λ. However, when the value of the instantaneous steering angle midpoint is equal to or higher than the predetermined deviation amount λ, as described in the above-mentioned steering angle midpoint computing routine, the value is not used for calculation of the smoothed steering angle midpoint this time. Accordingly, the amount of deviation of the value of the present control steering angle midpoint from the value of the smoothed steering angle midpoint calculated this time does not exceed the upper limit of the predetermined range. Accordingly, when the CPU 11 makes a negative determination in step S410, the amount of deviation is a value lower than the lower limit of the predetermined range. In this case, the present control steering angle midpoint has been set with high accuracy, and need not be changed. Therefore, the CPU 11 ends the steering angle midpoint correcting routine in step S430.

The control steering angle midpoint can be prevented from being changed frequently by considering whether the control steering angle midpoint needs to be updated based on the accuracy of the present control steering angle midpoint. Accordingly, the electric motor 30 that is controlled based on the control steering angle midpoint can be operated smoothly, and the driver can feel good assisting force.

When the steering angle midpoint correcting routine ends, the CPU 11 performs step S25 in the steering angle midpoint computing program shown in FIG. 5, and once ends the program. After a predetermined short time elapses, the CPU 11 starts the steering angle midpoint computing program again. When the driver changes the state of the ignition switch 22 from the ON state to the OFF state, the CPU 11 stores the finally set control steering angle midpoint in the EEPROM 14.

As can be understood from the description made so far, according to the first embodiment, even when the steering angle midpoint is deviated and the steering torque is applied such that the driver returns the steering wheel to the neutral position against the returning control by the electric motor 30, it is possible to determine whether the vehicle is running straight based on the axial force F serving as the acting force that acts on the rack bar 34. Thus, it is possible to accurately determine whether the vehicle is running straight. In the above-mentioned state, the resultant force of the steering torque applied to the steering shaft 33 by the driver and the assist torque that is applied due to driving the electric motor 30 and that substantially matches the steering torque acts on the rack bar 34 as the axial force F. Accordingly, the axial force F that act on the rack bar 34 becomes small force since the steering torque and the assist torque cancel each other. In this state, if the vehicle is actually running straight, the self-alignment torque input from the right and left front wheels FW1 and FW2 is a small value. Accordingly, if the state in which the axial force F that acts on the rack bar 34 matches the self-alignment torque is considered, it is possible to accurately determine whether the vehicle is running straight.

B: Second Embodiment

In the first embodiment, when the control steering angle midpoint is set by using the steering angle θ output from the steering angle sensor 35, the dead zone of the steering angle-motor current value characteristic is set to a broad zone immediately after starting, the instantaneous steering angle midpoint and the smoothed steering angle midpoint are calculated, and the accuracy of the control steering angle midpoint is improved. After this, the dead zone of the steering angle-motor current value characteristic is set to a narrow zone. Meanwhile, when the vehicle is provided with a behavior control device, e.g. VSC (Vehicle Stability Control), which includes means for detecting a movement state amount of the vehicle, e.g. an acceleration sensor or a yaw rate sensor, and which appropriately corrects the movement behavior of the vehicle, the neutral position of the steering shaft 33, which is set by the behavior control device may be employed as the control steering angle midpoint. Hereafter, a second embodiment of the invention will be described in detail. Note that, the structure and the operation of the behavior control device are not directly related to the invention, detailed description thereof will not be made here.

As shown by a dashed line in FIG. 1, the behavior control device 60 is provided with an accelerator sensor 61 that detects acceleration in the longitudinal direction of the vehicle and acceleration in the right-and-left direction of the vehicle, and a yaw rate sensor 62 that detects a yaw rate around the central axis, which occurs when the vehicle turns. The behavior control device 60 considerably accurately determines the movement behavior state of the vehicle based on the values transmitted from the acceleration sensor 61 and the yaw rate sensor 62. For example, the behavior control device 60 considerably accurately determines whether the vehicle is running straight or turning, or whether spin or drift-out occurs while the vehicle is turning. When it is highly possible that an abnormal behavior, for example, spin or drift-out will occur in the vehicle, the behavior control device 60 applies braking force to the right and left front wheels and the right and left rear wheels, thereby stabilizing the behavior of the vehicle. Since the behavior control device 60 needs to accurately determine the movement behavior state of the vehicle, the behavior control device 60 sets the neutral position of the steering shaft 33, that is, the reference point of the steering angle sensor 35 with considerably high accuracy.

When the behavior control device 60 is mounted in the vehicle, the dead zone can be set to a narrow zone from immediately after starting, by using the highly accurate reference point set by the behavior control device 60 as the control steering angle midpoint. In addition, since the reference point of the steering angle sensor 35 set by the behavior control device 60 has high accuracy, for example, the control steering angle midpoint need not be corrected, unlike the first embodiment. The behavior control device 60 is mounted in some types of vehicles in advance. In some of the other types of vehicles, although the vehicle is not provided with the behavior control device 60 in advance, the behavior control device 60 can be optionally mounted in the vehicle. Particularly, in the case of the types of vehicles which can be provided with the behavior control device 60 optionally, for each vehicle, it is necessary to set whether the steering angle midpoint computing program described in the first embodiment is performed. In the vehicle provided with the behavior control device 60, the steering angle midpoint computing program need not be performed. On the other hand, in the vehicle which is not provided with the behavior control device 60, the steering angle midpoint computing program needs to be performed. This setting process makes the production process complicated. Also, even when the behavior control device 60 is mounted in the vehicle, for example, if an abnormality occurs in the behavior control device 60, the steering angle midpoint computing program described in the first embodiment needs to be performed.

Figure 11:
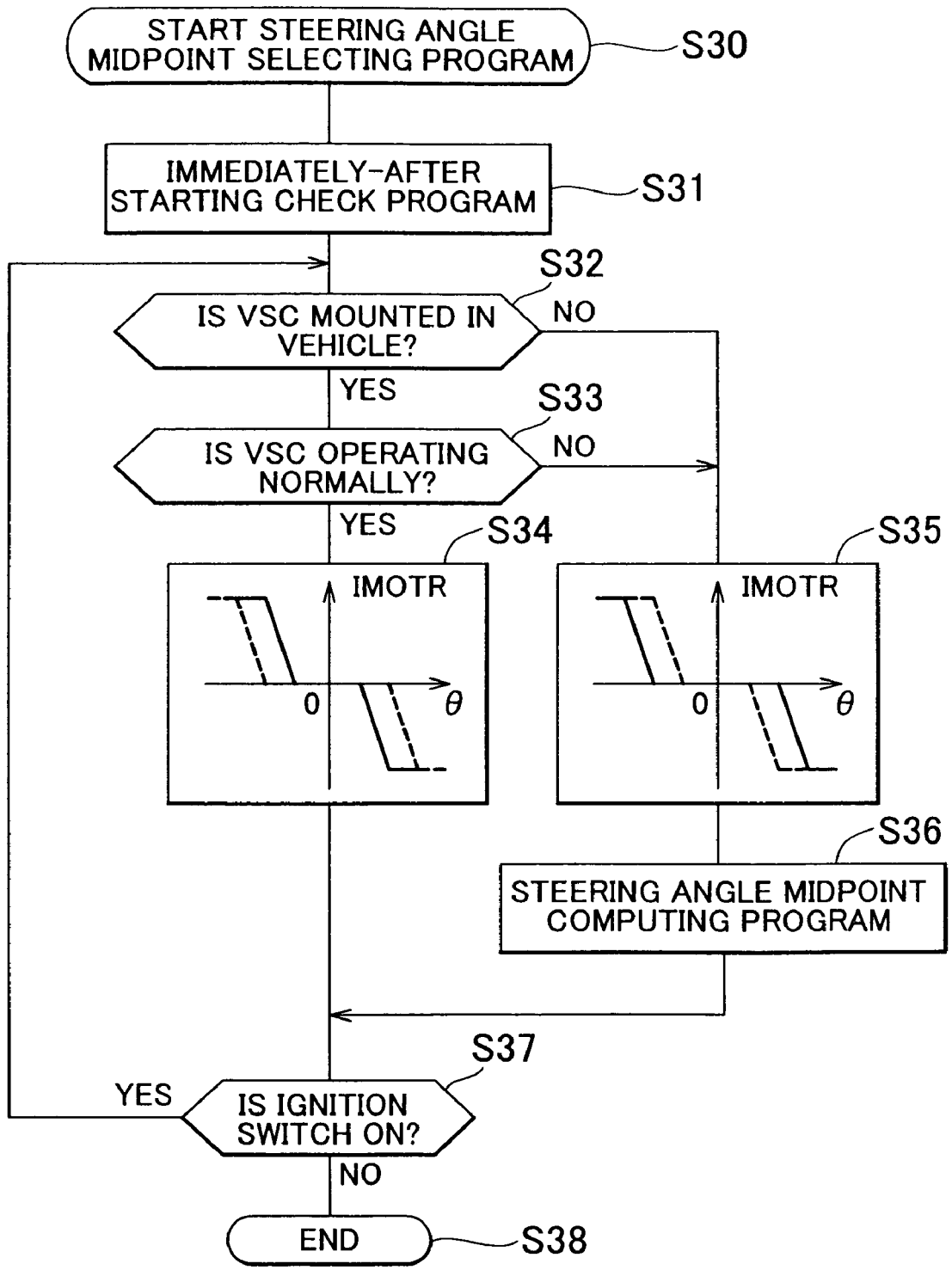
FIG. 11 is a flowchart showing a steering angle midpoint selecting program performed by the CPU shown in FIG. 2, according to a second embodiment of the invention.

Accordingly, regardless of whether the behavior control device 60 is mounted in the vehicle, a steering angle midpoint selecting program shown in FIG. 1 is stored in the memory 11a of the CPU 11 in advance. Thus, the above-mentioned problem can be solved. Hereafter, the steering angle midpoint selecting program will be described in detail with reference to FIG. 11.

After the ignition switch 22 is turned ON, the CPU 11 starts the steering angle midpoint selecting program in step S30. In step S31, the CPU 11 performs the same immediately-after-starting check program as that in the first embodiment. After performing the immediately-after-starting check program, the CPU 11 determines in step S32 whether the behavior control device 60 is mounted in the vehicle. Namely, the CPU 11 obtains a signal output from a CPU 63 that controls the operation of the behavior control device 60 (hereinafter, this signal will be referred to as a "VSC signal") via, for example, a multiplex communication line. Thus, the CPU 11 determines whether the behavior control device 60 is mounted in the vehicle. When it is determined in step S32 that the behavior control device 60 is mounted in the vehicle, the CPU 11 makes an affirmative determination, and performs step S33. In step S33, the CPU 11 determines whether the behavior control device 60 is operating properly. Namely, the CPU 11 determines whether the behavior control device 60 is operating properly based on operating state information concerning the behavior control device 60, which is indicated by the VSC signal transmitted from the CPU 63. When it is determined in step S33 that the behavior control device 60 is operating properly, the CPU 11 makes an affirmative determination, and performs step S34.

In step S34, the CPU 11 sets the dead zone of the steering angle-motor current value characteristic to a narrow zone, that is, sets the steering angle-motor current value characteristic to the normal characteristic. Since the behavior control device 60 is mounted in the vehicle and is operating properly, the reference point of the steering angle sensor 35, which is set by the behavior control device 60, that is, the control steering angle midpoint is considerably accurate. Accordingly, the CPU 11 sets the dead zone to a narrow zone from immediately after starting by setting the steering angle-motor current value characteristic to the normal characteristic. The CPU 11 controls the operation of the electric motor 30 based on the normal characteristic, and applies optimum assisting force to the steering shaft 33.

On the other hand, when it is determined in step S32 that the behavior control device 60 is not mounted in the vehicle, or when it is determined in step S33 that the behavior control device 60 is not operating properly, the CPU 11 makes a negative determination in step S32 or step S33, and performs step S35. In step S35, the CPU 11 sets the dead zone immediately after starting to a wide zone by setting the steering angle-motor current value characteristic to the initial characteristic. In this case, as in the case of the first embodiment, since the accuracy of the control steering angle midpoint is not high, in other words, since the highly accurate control steering angle midpoint cannot be obtained from the behavior control device 60, the dead zone immediately after starting is set to a wide zone. As in the case of the first embodiment, the CPU 11 performs the steering angle midpoint computing program in step S36.

After performing the steering angle midpoint computing program, the CPU 11 performs step S37, and determines whether the ignition switch 22 is ON. If the ignition switch 22 is ON, the CPU 11 makes an affirmative determination, and performs step S32 and the following steps again. While the ignition switch 22 is ON, step S32 and the following steps are repeatedly performed. Thus, the vehicle can be made to run safely by performing step S35 and the following steps when an abnormality has occurred in the behavior control device 60 while the vehicle is running. On the other hand, when the ignition switch 22 is OFF, the CPU 11 makes a negative determination in step S37, and ends the steering angle midpoint selecting program in step S38.

As can be understood from the description made so far, according to the second embodiment, the same effects as those in the first embodiment can be obtained. In addition, the steering angle midpoint selecting program can be performed regardless of whether the behavior control device 60 is mounted in the vehicle. Thus, when the behavior control device 60 is mounted in the vehicle and is operating properly, the control steering angle midpoint having considerably high accuracy can be used, and appropriate assisting force can be applied to the steering shaft 33 from immediately after starting. Accordingly, the driver can feel good sense of steering. Also, even when a failure occurs in the behavior control device 60, particularly, even when a failure occurs in the behavior control device 60 while the vehicle is running, the vehicle can be made to run safely by performing the steering angle midpoint computing program, as in the case of the first embodiment.

The invention is not limited to the first and the second embodiments. The invention may be realized in various other embodiments within the scope of the invention.

For example, in each of the first embodiment and the second embodiment, the pinion attached to the sheering shaft 33 and the rack bar 34 meshed with the pinion are used as the steering mechanism. However, instead of the pinion and the rack bar 34, for example, a ball screw and a ball nut may be used as the steering mechanism. With this structure, the same effects as those in each of the first embodiment and the second embodiment can be expected.

Also, in each of the first embodiment and the second embodiment, the axial force F of the rack bar 34 that matches the external force (self-alignment torque) input from the right and left front wheels FW1 and FW2 is calculated by combining the steering torque MT detected by the steering torque sensor 42 with the assist torque AT of the electric motor 30 calculated based on the motor current value I MOTR. However, an axial force sensor which directly detects the axial force F of the rack bar 34 may be provided, and the axial force F may be detected by the axial force sensor. In this case, the axial force sensor detects, as the axial force F of the rack bar 34, resultant force of acting force that acts on the rack bar 34 due to the steering torque applied to the steering shaft 33 via the steering wheel 31 and acting force that acts on the rack bar 34 by the assist torque due to driving of the electric motor 30.

With this structure, the same effects as those in each of the first embodiment and the second embodiment can be expected.

In each of the first embodiment and the second embodiment, the electric motor 30 transmits torque to the steering shaft 33 via the deceleration mechanism 32. However, the electric motor 30 may directly transmit torque to the rack bar 34 via the deceleration mechanism 32.

What is claimed is:

1. An electric power steering system comprising:
    a steering shaft which turns along with a steering wheel operated by a driver;
    a steering mechanism which connects the steering shaft to steered wheels of a vehicle, and which converts a turning motion of the steering shaft into a linear motion, thereby steering the steered wheels of the vehicle;
    an electric motor which applies assisting force for assisting a turning operation of the steering wheel;
    a steering angle sensor which detects a turning angle of the steering shaft; and
    a drive control unit which controls driving of the electric motor based on the turning angle detected by the steering angle sensor,
    wherein the drive control unit comprises:
       an acting force detecting portion that detects acting force that acts on the steering mechanism;
       a straight-running state determining portion that determines whether the vehicle is running straight based on whether the acting force continues to be detected for a predetermined time while the detected acting force is smaller than a reference value that is set, in advance, for determining whether the vehicle is running straight;
       a steering angle midpoint computing portion that calculates an average value of plural angles detected by the steering angle sensor in the predetermined time, and calculates a control steering angle midpoint, which indicates a reference point that is used when the steering angle sensor detects the turning angle of the steering shaft, by using the calculated average value, when the straight-running state determining portion determines that the vehicle is running straight; and
       a steering angle midpoint storing portion that updates the control steering angle midpoint calculated by the steering angle midpoint computing portion, and stores the updated steering angle midpoints,
    wherein the straight-running state determining portion comprises:
       a storage state checking portion that checks a storage state of the control steering angle midpoint that is stored in the steering angle midpoint storing portion; and
       a predetermined time changing portion that changes the predetermined time based on the storage state of the control steering angle midpoint, which is checked by the storage state checking portion.

2. The electric power steering system according to claim 1, wherein, in a case where the storage state checking portion confirms that the control steering angle midpoint is not stored in the steering angle midpoint storing portion, the predetermined time changing portion sets the predetermined time to a short time, as compared with a case where the control steering angle midpoint is stored in the steering angle midpoint storing portion.

3. The electric power steering system according to claim 1, wherein the straight-running state determining portion comprises:

a wheel spin detecting portion that detects wheel spin that has occurred in a drive wheel of the vehicle; and a straight-running state determination prohibiting portion that prohibits a running-straight state determination, when the wheel spin detecting portion detects the wheel spin that has occurred in the drive wheel.

4. The electric power steering system according to claim 3, wherein the wheel spin detecting portion detects wheel spin that has occurred in the drive wheel based on acceleration caused in the vehicle.

5. The electric power steering system according to claim 1, wherein the steering angle midpoint computing portion comprises:

a first steering angle midpoint calculating portion that calculates an accumulated value of the plural angles detected in the predetermined time each time the predetermined time has elapsed, and dividing the accumulated value by the predetermined time, thereby calculating a first steering angle midpoint that indicates an average value of the plural detected angles;

a second steering angle midpoint calculating portion that sequentially calculates second steering angle midpoints each of which indicates an average value of a predetermined number of the first steering angle midpoints each time the predetermined time has elapsed, by using the predetermined number of the first steering angle midpoints that are sequentially calculated by the first steering angle midpoint calculating portion each time the predetermined time has elapsed; and a control steering angle midpoint setting portion that sets the control steering angle midpoint to the second steering angle that is calculated by using the predetermined number of the first steering angle midpoints, among the second steering angle midpoints calculated by the second steering angle midpoint calculating portion.

6. The electric power steering system according to claim 1, wherein the steering angle midpoint computing portion comprises:

a first steering angle midpoint calculating portion that calculates an accumulated value of the plural angles detected in the predetermined time each time the predetermined time has elapsed, and dividing the accumulated value by the predetermined time, thereby calculating a first steering angle midpoint that indicates an average value of the plural detected angles;

a second steering angle midpoint calculating portion that assigns weights to a predetermined value and each of the first steering angle midpoints sequentially calculated by the first steering angle midpoint calculating portion each time the predetermined time has elapsed, and performing a filtering process, thereby sequentially calculating the second steering angle midpoint; and a control steering angle midpoint setting portion that sets the control steering angle midpoint, when the second steering angle midpoint sequentially calculated by the second steering angle midpoint calculating portion becomes a value in a predetermined range, to the second steering angle midpoint in the predetermined range.

7. The electric power steering system according to claim 6, wherein:

the steering angle midpoint computing portion includes a vehicle speed detecting portion that detects a vehicle speed; and the second steering angle midpoint calculating portion changes the weight assigned to the first steering angle midpoint used for calculating the second steering angle midpoint based on the vehicle speed detected by the vehicle speed detecting portion.

8. The electric power steering system according to claim 7, wherein the weight assigned to the first steering angle midpoint used for calculating the second steering angle midpoint is increased as the vehicle speed increases.

9. The electric power steering system according to claim 6, wherein, when an amount of deviation of a value of the first steering angle midpoint calculated by the first steering angle midpoint calculating portion from a value of the control steering angle midpoint set by the control steering angle midpoint setting portion is equal to or larger than a first deviation amount that is set in advance, the second steering angle midpoint calculating portion excludes the first steering angle midpoint, which is deviated from the value of the control steering angle midpoint by the first deviation amount or more, from calculation of the second steering angle midpoint.

10. The electric power steering system according to claim 6, wherein the control steering angle midpoint setting portion cancels the set control steering angle midpoint, when an amount of deviation of a value of the first steering angle midpoint calculated by the first steering angle midpoint calculating portion from a value of the set control steering angle midpoint is equal to or larger than a predetermined second deviation amount, and a number of times that the deviation amount becomes equal to or larger than the second deviation amount in succession becomes a predetermined number of times.

11. The electric power steering system according to claim 1, wherein the drive control unit includes steering angle midpoint accuracy determining portion for determining that the control steering angle midpoint stored in the steering angle midpoint storing portion is accurate, when an amount of deviation of the average value of the plural angles, which is calculated by the steering angle midpoint computing portion, from a value of the control steering angle midpoint stored in the steering angle midpoint storing portion is smaller than a predetermined third deviation amount, or when the control steering angle midpoint stored in the steering angle midpoint storing portion is updated.

12. The electric power steering system according to claim 11, wherein the drive control unit includes a prohibition range changing portion that broadens a range of the detected angle, in which driving of the electric motor is prohibited, when the steering angle midpoint accuracy determining portion determines that the control steering angle midpoint stored in the steering angle midpoint storing portion is not accurate.

13. The electric power steering system according to claim 1, wherein:

the drive control unit includes an electric power supply state monitoring portion that monitors a state of electric power supply from a battery mounted in the vehicle while the vehicle is parked; and the steering angle midpoint storing portion, when the electric power supply state monitoring portion determines that the state of electric power supply from the battery is not good, erases the stored control steering angle midpoint.

14. The electric power steering system according to claim 1, wherein the drive control unit comprises:

a mounting-presence-or-absence determining portion that determines whether a behavior control device which detects abnormal behavior while the vehicle is turning, and which corrects the detected abnormal behavior is mounted in the vehicle;

an employment-possibility determining portion that determines whether a neutral position of the steering shaft, which is set by the behavior control device for detecting a turning state of the vehicle, can be employed as the control steering angle midpoint; and a control steering angle midpoint selecting portion that selects the neutral position as the control steering angle midpoint, if the employment-possibility determining portion determines that the neutral position of the steering shaft can be employed as the control steering angle midpoint.

15. The electric power steering system according to claim 14, wherein the employment-possibility determining portion determines whether the neutral position of the steering shaft set by the behavior control device can be employed as the control steering angle midpoint based on an operating state of the behavior control device.

16. The electric power steering system according to claim 14, wherein the behavior control device mounted in the vehicle sets the neutral position of the steering shaft based on a yaw rate caused in the vehicle or lateral acceleration caused in the vehicle.

17. An electric power steering system comprising:

a steering shaft which turns along with a steering wheel operated by a driver;

a steering mechanism which connects the steering shaft to steered wheels of a vehicle, and which converts a turning motion of the steering shaft into a linear motion, thereby steering the steered wheels of the vehicle;

an electric motor which applies assisting force for assisting a turning operation of the steering wheel;

a steering angle sensor which detects a turning angle of the steering shaft; and a drive control unit which controls driving of the electric motor based on the turning angle detected by the steering angle sensor, wherein the drive control unit comprises:

acting force detecting means for detecting acting force that acts on the steering mechanism;

straight-running state determining means for determining whether the vehicle is running straight based on whether the acting force continues to be detected for a predetermined time while the detected acting force is smaller than a reference value that is set, in advance, for determining whether the vehicle is running straight;

steering angle midpoint computing means for calculating an average value of plural angles detected by the steering angle sensor in the predetermined time, and for calculating a control steering angle midpoint, which indicates a reference point that is used when the steering angle sensor detects the turning angle of the steering shaft, by using the calculated average value, when the straight-running state determining means determines that the vehicle is running straight; and steering angle midpoint storing means for updating the control steering angle midpoint calculated by the steering angle midpoint computing means, and for storing the updated steering angle midpoint, wherein the straight-running state determining means comprises:

a storage state checking portion that checks a storage state of the control steering angle midpoint that is stored in the steering angle midpoint storing means; and a predetermined time changing portion that changes the predetermined time based on the storage state of the control steering angle midpoint, which is checked by the storage state checking portion.

* * * * *